US011620736B2

(12) United States Patent
Tanizaki et al.

(10) Patent No.: US 11,620,736 B2
(45) Date of Patent: Apr. 4, 2023

(54) IMAGE PROCESSING DEVICE, CONTROL METHOD, AND CONTROL PROGRAM

(71) Applicant: PFU LIMITED, Kahoku (JP)

(72) Inventors: Hiroki Tanizaki, Kahoku (JP); Kiyoto Kosaka, Kahoku (JP)

(73) Assignee: PFU LIMITED, Kahoku (JP)

( * ) Notice: Subject to any disclaimer, the term of this patent is extended or adjusted under 35 U.S.C. 154(b) by 75 days.

(21) Appl. No.: 17/263,404

(22) PCT Filed: Oct. 29, 2018

(86) PCT No.: PCT/JP2018/040184
§ 371 (c)(1),
(2) Date: Mar. 1, 2021

(87) PCT Pub. No.: WO2020/089984
PCT Pub. Date: May 7, 2020

(65) Prior Publication Data
US 2021/0192694 A1 Jun. 24, 2021

(51) Int. Cl.
*G06T 5/00* (2006.01)
*G06V 10/30* (2022.01)

(52) U.S. Cl.
CPC .............. *G06T 5/005* (2013.01); *G06T 5/002* (2013.01); *G06V 10/30* (2022.01); *G06T 2207/20024* (2013.01)

(58) Field of Classification Search
CPC ........... G06T 5/002; G06T 2207/20024; G06T 2207/30176; G06T 2207/10008;
(Continued)

(56) References Cited

U.S. PATENT DOCUMENTS

2009/0190831 A1* 7/2009 Van Der Putten ... G06V 10/245
382/165
2017/0018070 A1* 1/2017 Onuma ................. H04N 7/181
(Continued)

FOREIGN PATENT DOCUMENTS

JP    10-112800 A    4/1998
JP    2008-134970 A    6/2008

OTHER PUBLICATIONS

International Search Report dated Jan. 29, 2019 for corresponding PCT Application No. PCT/JP2018/040184 (2 pages) with English Translation (1 page).
(Continued)

*Primary Examiner* — Margaret G Mastrodonato
(74) *Attorney, Agent, or Firm* — Lewis Roca Rothgerber Christie LLP

(57) ABSTRACT

An image processing apparatus includes a storage device to store a shading pattern in which a condition of gradation values of a target pixel and a plurality of pixels having a predetermined positional relationship with respect to the target pixel are set, a processor to acquire an multiple value image, generate a binary image from the multiple value image, detect a pixel satisfying the condition set in the shading pattern from the multiple value image as a part of a shading, a generate a shading removal pattern for removing the detected shading, based on the multiple value image, generate a shading removal image by applying the shading removal pattern to the binary image, and an output device to output the shading removal image or information generated using the shading removal image.

14 Claims, 18 Drawing Sheets

(58) Field of Classification Search
CPC ...... G06V 10/245; G06V 10/60; G06V 10/34; G06V 30/40
See application file for complete search history.

(56) References Cited

U.S. PATENT DOCUMENTS

2018/0336665 A1* 11/2018 Miyauchi ................ G06T 5/006
2019/0266706 A1*  8/2019 Mondal .................... G06T 7/11

OTHER PUBLICATIONS

Written Opinion dated Jan. 29, 2019 for corresponding PCT Application No. PCT/JP2018/040184 (3 pages) with English Translation (4 pages).
International Preliminary Report on Patentability Report dated Apr. 27, 2021 for corresponding PCT Application No. PCT/JP2018/040184 (4 pages) with English Translation (5 pages).

* cited by examiner

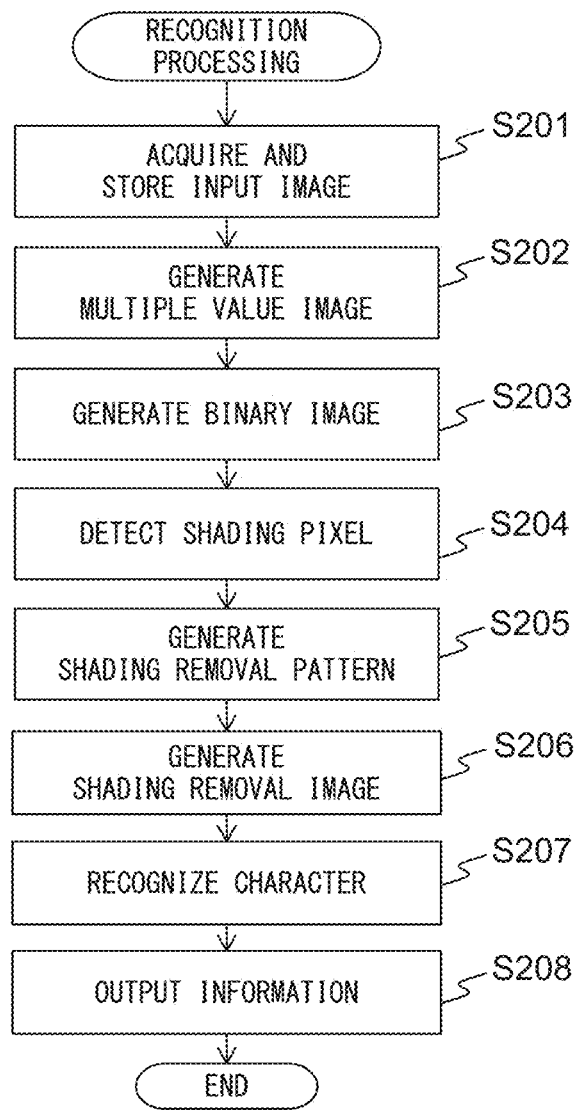

IMAGE PROCESSING DEVICE, CONTROL METHOD, AND CONTROL PROGRAM

CROSS-REFERENCE TO RELATED APPLICATION(S)

This application is a U.S. National Phase Patent Application of International Patent Application Number PCT/JP2018/040184, filed on Oct. 29, 2018, the entire content of which is incorporated herein by reference.

FIELD

The present disclosure relates to an image processing apparatus, a control method, and a control program, and particularly to an image processing apparatus, a control method, and a control program for processing an image including a shading.

BACKGROUND

In a company in which a person in charge manually converts a business form such as an invoice into data, a demand for efficiency improvement of work for data conversion of business forms is rising, since the business burden of the person in charge increases when data conversion of a huge number of business forms is necessary. In order to efficiency improve work for data conversion of the business forms, it is necessary for a computer to correctly recognize characters described in the business forms. However, when characters are printed on a paper including a shading paper in a business form, the characters may not be recognized correctly.

A character recognition apparatus to detect a center position of a connecting component of black pixels having a diameter substantially same as a standard halftone dot from a shaded image, and generate a shaded image by removing the connecting component from the shaded image is disclosed (PTL 1).

CITATION LIST

Patent Literature

[PTL 1] Japanese Unexamined Patent Application Publication (Kokai) No. 2008-134970

SUMMARY

An image processing apparatus is required to more accurately remove a shading from an image including a shading.

An object of an image processing apparatus, a control method and a control program is to more accurately remove the shading from the image including the shading.

According to some embodiments, an image processing apparatus includes a storage device to store a shading pattern in which a condition of gradation values of a target pixel and a plurality of pixels having a predetermined positional relationship with respect to the target pixel are set, an acquisition module to acquire a multiple value image, a binary image generation module to generate a binary image from the multiple value image, a detection module to detect a pixel satisfying the condition set in the shading pattern from the multiple value image as a part of a shading, a shading removal pattern generation module to generate a shading removal pattern for removing the detected shading, based on the multiple value image, a shading removal image generation module to generate a shading removal image by applying the shading removal pattern to the binary image, and an output device to output the shading removal image or information generated using the shading removal image.

According to some embodiments, an image processing apparatus includes a storage device to store a shading pattern in which a condition of gradation values of a target pixel and a plurality of pixels having a predetermined positional relationship with respect to the target pixel are set, an acquisition module to acquire a multiple value image, a detection module to detect a pixel satisfying the condition set in the shading pattern from the multiple value image as a part of a shading, a shading removal pattern generation module to generate a shading removal pattern for removing the detected shading, based on the multiple value image, a shading removal image generation module to generate a shading removal image by applying the shading removal pattern to the multiple value image, and an output device to output the shading removal image or information generated using the shading removal image.

According to some embodiments, a control method of an image processing apparatus including a storage device and an output device, includes storing a shading pattern in which a condition of gradation values of a target pixel and a plurality of pixels having a predetermined positional relationship with respect to the target pixel are set, in the storage device, acquiring a multiple value image, generating a binary image from the multiple value image, detecting a pixel satisfying the condition set in the shading pattern from the multiple value image as a part of a shading, generating a shading removal pattern for removing the detected shading, based on the multiple value image, generating a shading removal image by applying the shading removal pattern to the binary image, and outputting the shading removal image or information generated using the shading removal image from the output device.

According to some embodiments, a control method of an image processing apparatus including a storage device and an output device, includes storing a shading pattern in which a condition of gradation values of a target pixel and a plurality of pixels having a predetermined positional relationship with respect to the target pixel are set, in the storage device, storing a shading pattern in which a condition of gradation values of a target pixel and a plurality of pixels having a predetermined positional relationship with respect to the target pixel are set, in the storage device, acquiring a multiple value image, detecting a pixel satisfying the condition set in the shading pattern from the multiple value image as a part of a shading, generating a shading removal pattern for removing the detected shading, based on the multiple value image, generating a shading removal image by applying the shading removal pattern to the multiple value image, and outputting the shading removal image or information generated using the shading removal image from the output device According to some embodiments, a control program of an image processing apparatus including a storage device and an output device, causes the image processing apparatus to execute storing a shading pattern in which a condition of gradation values of a target pixel and a plurality of pixels having a predetermined positional relationship with respect to the target pixel are set, in the storage device, acquiring a multiple value image, generating a binary image from the multiple value image, detecting a pixel satisfying the condition set in the shading pattern from the multiple value image as a part of a shading, generating a shading removal pattern for removing the detected shading, based on the multiple value image, generating a shading removal image by applying the shading removal pattern to the binary image, and outputting the shading removal image or information generated using the shading removal image from the output device.

According to some embodiments, a control program of an image processing apparatus including a storage device and an output device, causes the image processing apparatus to execute storing a shading pattern in which a condition of gradation values of a target pixel and a plurality of pixels having a predetermined positional relationship with respect to the target pixel are set, in the storage device, acquiring a multiple value image, detecting a pixel satisfying the condition set in the shading pattern from the multiple value image as a part of a shading, generating a shading removal pattern for removing the detected shading, based on the multiple value image, generating a shading removal image by applying the shading removal pattern to the multiple value image, and outputting the shading removal image or information generated using the shading removal image from the output device.

According to the present embodiment, the image processing apparatus, the control method and the control program can more accurately remove the shading from the image including the shading.

The object and advantages of the invention will be realized and attained by means of the elements and combinations, in particular, described in the claims. It is to be understood that both the foregoing general description and the following detailed description are exemplary and explanatory, and are not restrictive of the invention, as claimed.

BRIEF DESCRIPTION OF DRAWINGS

FIG. 5 is a flowchart illustrating an operation of a recognition processing.

DESCRIPTION OF EMBODIMENTS

Figure 1:
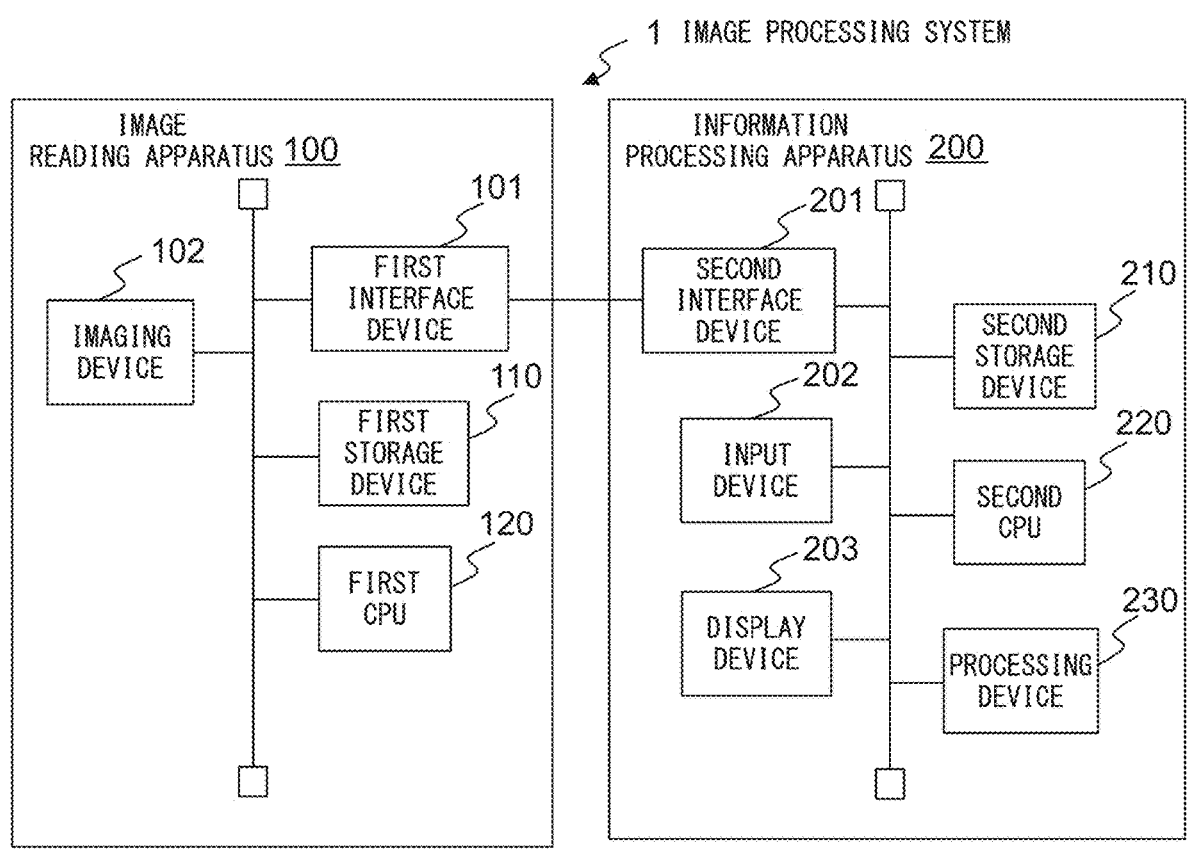
FIG. 1 is a diagram illustrating a schematic configuration of an image processing system 1 according to an embodiment.

Hereinafter, an image processing apparatus, a control method and a control program according to an embodiment, will be described with reference to the drawings. However, it should be noted that the technical scope of the invention is not limited to these embodiments, and extends to the inventions described in the claims and their equivalents FIG. 1 is a diagram illustrating a schematic configuration of an image processing system according to an embodiment. As shown in FIG. 1, the image processing system 1 includes an image reading apparatus 100 and an information processing apparatus 200.

The image reading apparatus 100 is, for example, a scanner device, etc. The image reading apparatus 100 is connected to the information processing apparatus 200. The information processing apparatus 200 is an example of an image processing apparatus, and is, for example, a personal computer, etc.

The image reading apparatus 100 includes a first interface device 101, an imaging device 102, a first storage device 110, and a first CPU (Control Processing Unit) 120.

The first interface device 101 has an interface circuit according to a serial bus such as a USB (Universal Serial Bus) and electrically connects to the information processing apparatus 200 to transmit and receive image data and various types of information. Instead of the first interface device 101, a communication device having an antenna for transmitting and receiving a wireless signal and a wireless communication interface circuit for transmitting and receiving signals through a wireless communication line according to a predetermined communication protocol may be used. For example, the predetermined communication protocol is a wireless local area network (LAN).

The imaging device 102 includes an image capturing sensor of a reduction optical system type including an image capturing element constituted of charge coupled devices (CCDs) arranged linearly in the main scanning direction.

Further, the imaging device 102 includes a light source for irradiating light, a lens for forming an image on the image capturing element, and an A/D converter for amplifying and analog/digital (A/D) converting an electrical signal output from the is capturing element. In the imaging device 102, the image capturing sensor images a surface of a conveyed paper to generate and output an analog image signal, and the A/D converter performs A/D conversion of the analog image signal to generate and output a digital input image. The input image is a color multiple value image in which each pixel data is 24-bit data composed of R (red) values, G (green) values and B (blue) values represented by 8 bits for each RGB color, for example. Note that a contact image sensor (CIS) of an unmagnification optical system type including an image capturing element constituted of a complementary metal oxide semiconductor (CMOS) instead of the CCD may be used.

The storage device 110 includes memory devices such as a RAM (Random Access Memory), a ROM (Read Only Memory), etc., a fixed disk device such as a hard disk, or a portable storage device such as a flexible disk, an optical disk, etc. The storage device 110 stores computer programs, databases, tables, etc., used for various kinds of processing of the image processing apparatus 100. The computer program may be installed on the storage device 301 from a computer-readable, non-transitory medium such as a compact disc read only memory (CD-ROM), a digital versatile disc read only memory (DVD-ROM), or the like by using a well-known setup program etc. The first storage device 110 stores an input image, etc., generated by the imaging device 102.

The first CPU 120 operates according to a program stored in advance in the first storage device 110. Note that a digital signal processor (DSP), a large scale integration (LSI), etc., may be used instead of the first CPU 120. Alternatively, an Application Specific Integrated Circuit (ASIC), a field-programming gate array (FPGA) etc., may be used instead of the first CPU 120.

The first CPU 120 is connected to the first interface device 101, the imaging device 102 and the storage device 110, etc., and controls each of the modules. The first CPU 120 performs document reading control of the imaging device 102, data transmission and reception control with the information processing apparatus 200 via the first interface device 101, etc.

The information processing apparatus 200 includes a second interface device 201, an input device 202, a display device 203, a second storage device 210, a second CPU 220, and a processing device 230. Hereinafter, each part of the information processing apparatus 200 will be described in detail.

The second interface device 201 has an interface circuit similar to the first interface device 101 of the image reading apparatus 100 and connects the information processing apparatus 200 and the image reading apparatus 100. Further, instead of the second interface device 201, a communication device having an antenna for transmitting and receiving a wireless signal and a wireless communication interface circuit for transmitting and receiving signals through a wireless communication line according to a predetermined communication protocol such as wireless LAN, may be used.

The input device 202 includes an input device such as a keyboard, a mouse, and an interface circuit that acquires a signal from the input device, and outputs a signal depending on the user input to the second CPU 220.

The display device 203 is an example of an output device. The display device 203 includes a display constituted of a liquid crystal, an organic electro-luminescence (EL), etc., and an interface circuit that outputs image data to the display, is connected to the second storage device 210, and outputs image data stored in the second storage device 210 to the display.

The second storage device 210 includes memory devices, a fixed disk device, a portable storage device, etc., similar to the first storage device 110 of the image reading apparatus 100. The second storage device 210 stores computer programs, databases, tables, etc., used for various kinds of processing of the information processing apparatus 200. The computer program may be installed on the storage device 301 from a computer-readable, non-transitory medium such as a CD-ROM, a DVD-ROM, or the like by using a well-known setup program etc. The second storage device 210 stores the input image received from the image reading apparatus 100 and various processing images processed on the input image by the processing device 230. Further, the second storage device 210 stores a plurality of shading patterns in which a condition of gradation values of a target pixel and a plurality of pixels having a predetermined positional relationship with respect to the target pixel are set. Details of the shading pattern will be described later.

The second CPU 220 operates according to a program stored in advance in the second storage device 210. Note that a DSP, a LSI, an ASIC, a FPGA, etc., may be used instead of the second CPU 220.

The second CPU 220 is connected to the second interfacing device 201, the input device 202, the display device 203, the second storage device 210 and the processing device 230, etc., and controls each of the modules. The second CPU 220 performs data transmission and reception control with the image reading apparatus 100 via the second interface device 201, input control of the input device 202, display control of the display device 203, control of image processing by the processing device 230, etc The processing device 230 executes predetermined image processing on the input image. The processing device 230, a CPU, a DSP, a LSI, an ASIC or a FPGA, etc FIG. 2 is a diagram illustrating a schematic configuration of a second storage device 210 and a second CPU 220.

Figure 2:
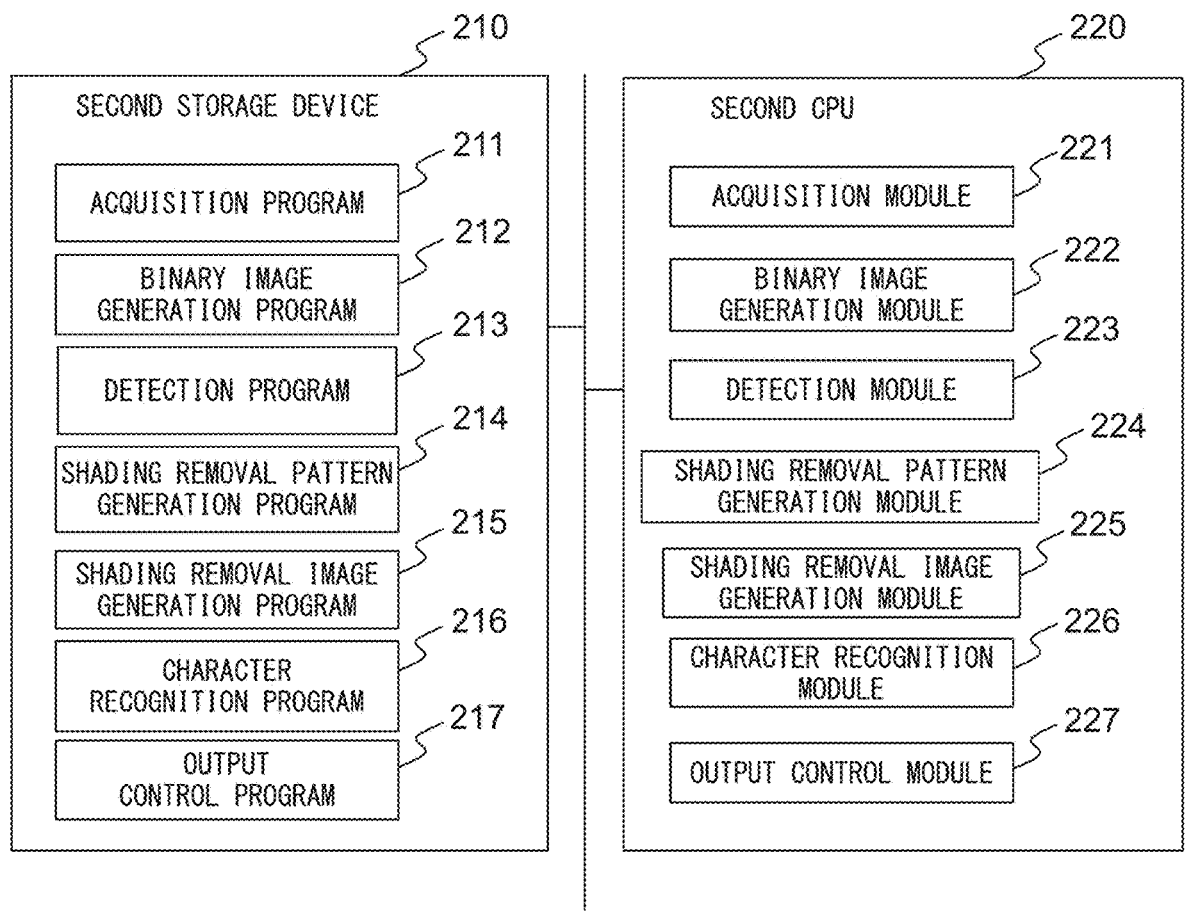
FIG. 2 is a diagram illustrating a schematic configuration of a second storage device 210 and a second CPU 220.

As shown in FIG. 2, the second storage device 210 stores each program such as an acquisition program 211, a binary image generation program 212, a detection program 213, a shading removal pattern generation program 214, a shading removal image generation program 215, a character recognition program 216 and an output control program 217, etc. Each of these programs is a functional module implemented by software operating on a processor. The second CPU 220 reads each of the programs stored in the second storage device 210 and operates according to each of the read programs. Thus, the second CPU220 functions as an acquisition module 221, a binary image generation module 222, a detection module 223, a shading removal pattern generation module 224, a shading removal image generation module 225, a character recognition module 226 and an output control module 227.

FIGS. 3A to 3E are schematic diagrams for illustrating a shading pattern.

In business forms such as invoices, characters may be primed on a paper including a shading. The shading is a pattern in which a plurality of points or symbols such as circles, or lines such as horizontal lines, vertical lines and/or diagonal lines having a specific color are arranged periodically. Generally, as the specific color, a color different from both a background color such as white and a character color such as black, in particular, a color of its intermediate (e.g., gray) is used.

FIG. 3A to FIG. 3E illustrate an example of the shading pattern for detecting a shading in which a plurality of points are periodically arranged. FIG. 3A to FIG. 3E show different shading patterns, respectively. In FIG. 3A to FIG. 3E, each rectangle indicates each pixel in an image.

Figure 3A:
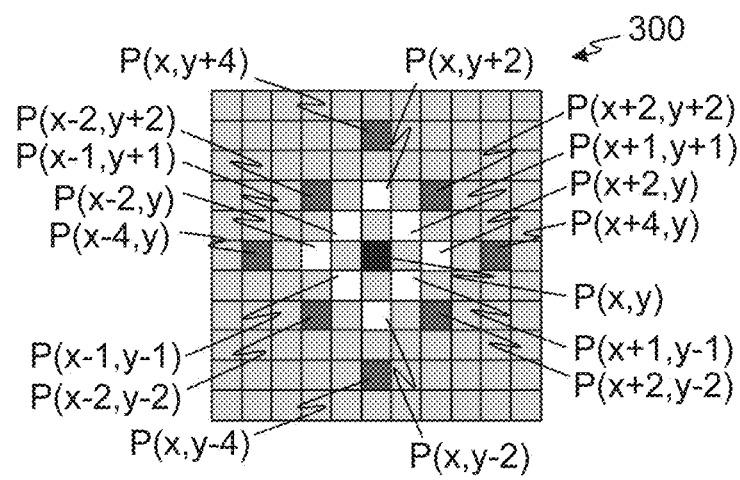
FIG. 3A is a schematic diagram for illustrating a shading pattern.

In a shading pattern 300 shown in FIG. 3A, a parameter of each pixel P indicates a coordinate of a left and right (horizontal) direction and an up and down (vertical) direction in which each pixel P is located. A pixel P (x, y) is a target pixel located in a coordinate (x, y)

In the shading pattern 300, the following eight Conditions are set.

$V(x,y+2)-V(x,y)>T$ and $V(x,y+2)-V(x,y+4)>T$       Condition 1:

$V(x,y-2)-V(x,y)>T$ and $V(x,y-2)-V(x,y-4)>T$       Condition 2:

$V(x+2,y)-V(x,y)>T$ and $V(x+2,y)-V(x+4,y)>T$       Condition 3:

$V(x-2,y)-V(x,y)>T$ and $V(x-2,y)-V(x-4,y)>T$       Condition 4:

$V(x+1,y+1)-V(x,y)>T$ and $V(x+1,y+1)-V(x+2,y+2)>T$   Condition 5:

$V(x-1,y-1)-V(x,y)>T$ and $V(x-1,y-1)-V(x-2,y-2)>T$   Condition 6:

$V(x-1,y+1)-V(x,y)>T$ and $V(x-1,y+1)-V(x-2,y-2)>T$   Condition 7:

$V(x+1,y-1)-V(x,y)>T$ and $V(x+1,y-1)-V(x+2,y-2)>T$   Condition 8:

Wherein, V ($\alpha$, $\beta$) is a gradation value of a pixel P ($\alpha$, $\beta$), and T is a threshold value. The gradation value is a color value (R value, G value or B value) or a maximum value of each color value, etc. A first equation of Condition 1 defines that, when it is assumed that a target pixel corresponds to a symbol, a background pixel corresponding to a background exists at a position apart from the target pixel by two pixels in the upper direction, wherein the background pixel has a gradation value higher than a gradation value of the target pixel, and a difference value between the gradation value of the background pixel and the gradation value of the target pixel is larger than a threshold T. Further, a second equation of Condition 1 defines that a symbol pixel corresponding to a symbol exists at a position further apart from the background pixel by two pixels in the upper direction, wherein the symbol pixel has a gradation value lower than the gradation value of the background pixel, and a difference value between the gradation value of the symbol pixel and the gradation value of the background pixel is larger than the threshold T. Similarly, first equations of Conditions 2 to 8 defines that background pixels exist at positions apart from the target pixel by two pixels, respectively, in the lower, right, left, upper right, lower left, upper left and lower right directions, wherein each of the background pixels has a gradation value higher than the gradation value of the target pixel, and a difference value between each of the gradation values of the background pixels and the gradation value of the target pixel is larger than a threshold T. Further, a second equation of Conditions 2 to 8 defines that symbol pixels exist at positions apart from the background pixels by two pixels, respectively, in the lower right, left, upper right, lower left, upper left and lower right directions, wherein each of the symbol pixels has a gradation value lower than each of the gradation values of the background pixels, and a difference value between each of the gradation values of the symbol pixels and each of the gradation values of the background pixels is larger than a threshold T.

In the multiple value image, a pixel adjacent to a pixel corresponding to a symbol having a is specific color has a color between the specific color and a background color, and the gradation value changes depending on a position of the imaging element of the imaging device 102 when the symbol is imaged. Therefore, in the shading pattern 300, a condition is not set for a gradation value of an adjacent pixel adjacent to the target pixel, in the vertical direction and the horizontal direction.

It may be set that a gradation value of a pixel between the target pixel and the background pixel has a value between the gradation value of the target pixel and the gradation value of the background pixel, and a gradation value of a pixel between the background pixel and the symbol pixel has a value between the gradation value of the background pixel and the gradation value of the symbol pixel, as the vertical or horizontal direction conditions. In that case, the following four Conditions 1' to 4' are added to, respectively, the above Conditions 1 to 4.

$V(x,y+2)'>V(x,y+1)>V(x,y)$ and $V(x,y+2)'>V(x,y+3)>V(x,y+4)$       Condition 1':

$V(x,y-2)>V(x,y-1)>V(x,y)$ and $V(x,y-2)>V(x,y-3)>V(x,y-4)$       Condition 2':

$V(x+2,y)'>V(x+1,y)>V(x,y)$ and $V(x+2,y)>V(x+3,y)>V(x+4,y)$       Condition 3':

$V(x-2,y)>V(x-1,y)>V(x,y)$ and $V(x-2,y)>V(x-3,y)>V(x-4,y)$       Condition 4':

In other words, when the conditions corresponding to the shading pattern 300 are satisfied, symbols exist apart from the symbol corresponding to the target pixel by substantially the same distance, in eight directions (the vertical, horizontal and oblique directions), across the background.

Figure 3B:
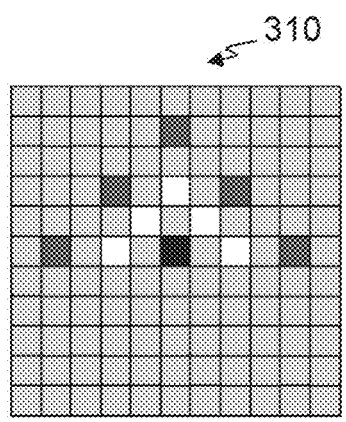
FIG. 3B is a schematic diagram for illustrating the shading pattern.

In the shading pattern 310 shown in FIG. 3B, only Conditions 1, 3, 4, 5, 7 among the above eight Conditions are set, and the conditions in the lower left, lower and lower right directions from the symbol corresponding to the target pixel are not set. In other words, when the conditions corresponding to the shading pattern 310 are satisfied, symbols exist apart from the symbol corresponding to the target pixel by substantially the same distance, in the left, upper left, upper, upper right and right directions, across the background. Symbols that overlap a character, etc., and by which a shading is not continuous, are detected in the lower direction, by the shading pattern 310.

Figure 3C:
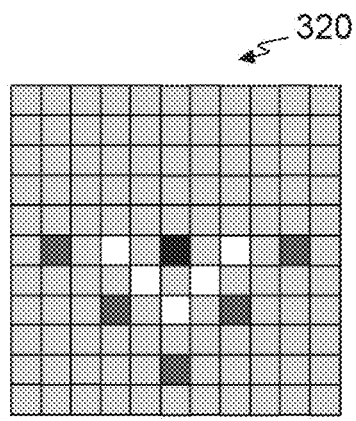
FIG. 3C is a schematic diagram for illustrating the shading pattern.

In the shading pattern 320 shown in FIG. 3C, only Conditions 2, 3, 4, 6, 8 among the above eight Conditions are set, and the conditions in the upper right, upper and upper left directions from the symbol corresponding to the target pixel are not set. In other words, when the conditions corresponding to the shading pattern 320 are satisfied, symbols exist apart from the symbol corresponding to the target pixel by substantially the same distance, in the left, lower left, lower, lower right and right directions, across the background Symbols that overlap a character, etc., and by which a shading is not continuous, are detected in the upper direction, by the shading pattern 320.

Figure 3D:
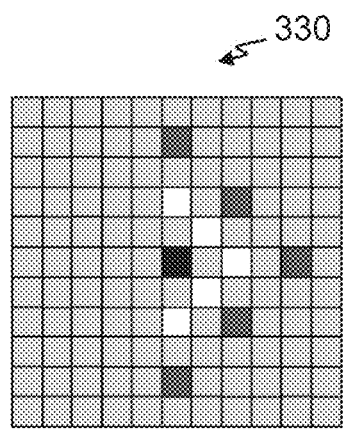
FIG. 3D is a schematic diagram for illustrating the shading pattern

In the shading pattern 330 shown in FIG. 3D, only Conditions 1, 2, 3, 5, 8 among the above eight Conditions are set, and the conditions in the upper left, left and lower left directions from the symbol corresponding to the target pixel are not set. In other words, when the conditions corresponding to the shading pattern 330 are satisfied, symbols exist apart from the symbol corresponding to the target pixel by substantially the same distance, in the upper, upper right, right, lower right and lower directions, across the background. Symbols that overlap a character, etc., and by which a shading is not continuous, are detected in the left direction, by the shading pattern 330.

Figure 3E:
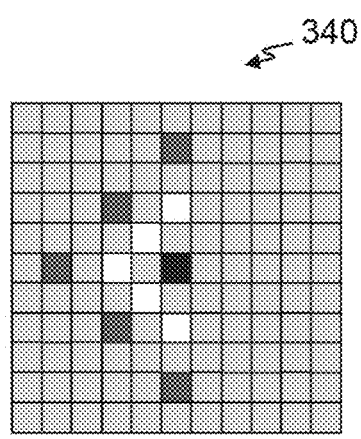
FIG. 3E is a schematic diagram for illustrating the shading pattern

In the shading pattern 340 shown in FIG. 3E, only Conditions 1, 2, 4, 6, 7 among the above eight Conditions are set, and the conditions in the upper right, right and lower right directions from the symbol corresponding to the target pixel are not set. In other words, when the conditions corresponding to the shading pattern 340 are satisfied, symbols exist apart from the symbol corresponding to the target pixel by substantially the same distance, in the upper, upper left, left, lower left and lower directions, across the background. Symbols that overlap a character, etc., and by which a shading is not continuous, are detected in the right direction, by the shading pattern 340.

Thus, relationships between gradation values of each pixel are set in the shading pattern, as conditions of gradation values of the target pixel and a plurality of pixels having a predetermined positional relationship with respect to the target pixel. This relationship is not limited to the difference, and may be a ratio, etc. The shading pattern is not limited to a pattern corresponding to a figure in which symbols such as a plurality of points or circles are located periodically, and may be a pattern corresponding to a figure in which lines such as a plurality of horizontal lines, vertical lines and/or diagonal lines are located periodically. The shading pattern stored in the information processing apparatus 200 may be only one rather than a plurality. Further, the condition set in each shading pattern may be only one rather than a plurality.

Figure 4:
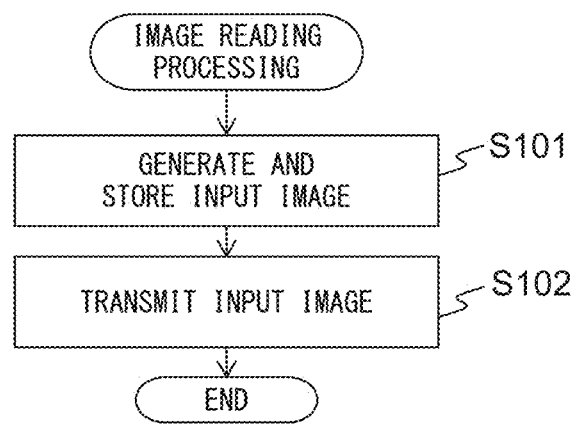
FIG. 4 is a flowchart illustrating an operation of an image reading processing.

FIG. 4 is a flowchart illustrating an operation of an image reading processing performed by the image reading apparatus 100. Hereinafter, the operation of the image reading processing will be described with referring to the flowchart illustrated in FIG. 4. Note that a flow of the operation described below is performed in cooperation with each element of the image reading apparatus 100 mainly by the first CPU 120, based on the program being previously stored in the first storage device 110.

First, the imaging device 102 generates an input image by imaging a business form such as an invoice in which a shading is included, as a document, and stores the input image in the first storage device 110 (step S101)

Next, the first CPU 120 transmits the input image stored in the first storage device 110 to the information processing apparatus 200 through the first interface device 101 (step S102), and ends a series of the steps.

FIG. 5 is a flowchart illustrating an operation of a recognition processing by the information processing apparatus 200. Hereinafter, the operation of the recognition processing will be described with referring to the flowchart illustrated in FIG. 5. Note that a flow of the operation described below is performed in cooperation with each element of the information processing apparatus 200 mainly by the second CPU 220, based on the program being previously stored in the second storage device 210.

First, the acquisition module 221 acquires the input image from the image reading apparatus 100 through the second interface device 201 and stores the acquired image in the second storage device 210 (step S201).

Next, the acquisition module 221 generates a black-and-white multiple value image from the input image that is a multiple value image and acquires the black-and-white multiple value image, as a multiple value image (step S202). The acquisition unit 221 specifies the maximum value among an R value, a G value and a B value of each pixel for each pixel in the input image, and generates the black-and-white multiple value image in which the specified maximum value is a gradation value (luminance value) of pixel corresponding to each pixel. The acquisition module 221 may acquire the input image that is a color multiple value image as a multiple value image as it is.

Figure 6A:
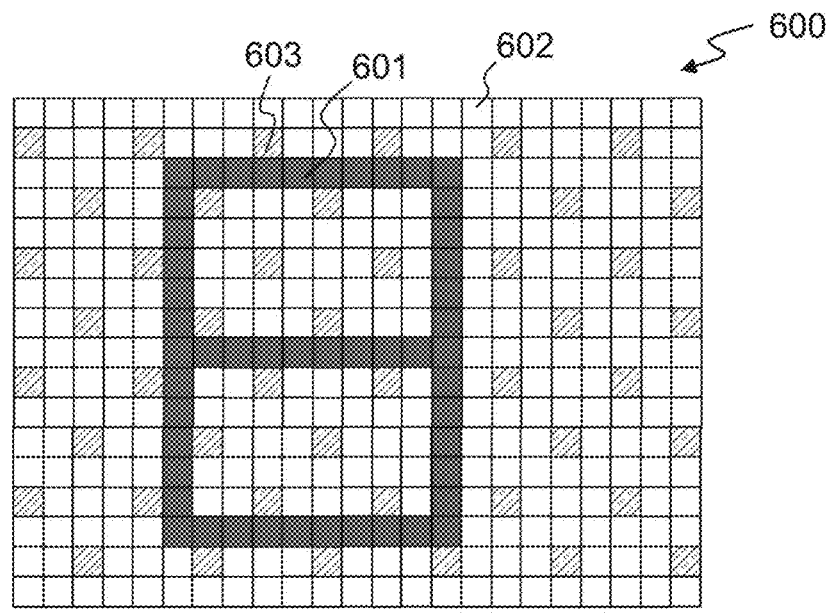
FIG. 6A is a schematic diagram illustrating an example of a region 600 of a part of a multiple value image.

FIG. 6A is a schematic diagram illustrating an example of a region 600 of a part of a multiple value image.

As shown in FIG. 6A, a character 601, a background 602, and symbols 603 are imaged in the region 600 of a part of the multiple value image. In the region 600, a shading is formed by a is plurality of symbols 603 periodically located on the background 602, and the character 601 is located on the shading. In the region 600, the character 601 has a black color, the background 602 has a white color, and the symbols 603 have a gray color that is a color between white and black.

Next, the binary image generation module 222 generates a binary image acquired by binarizing the multiple value image from the acquired multiple value image (step S203). The binary image generation module 222 generates an image in which a pixel whose gradation value is equal to or more than a threshold value in the multiple value image is set as a white pixel and a pixel whose gradation value is less than the threshold value is set as a black pixel, as a binary image. The threshold value is set to be larger than a gradation value of a pixel forming a symbol of a general shading or a general character by prior experiments. Thus, in the binary image, pixels corresponding to characters and symbols of a shading in the multiple value image are set as black pixels, and pixels corresponding to other pixels are set as white pixels.

Figure 6B:
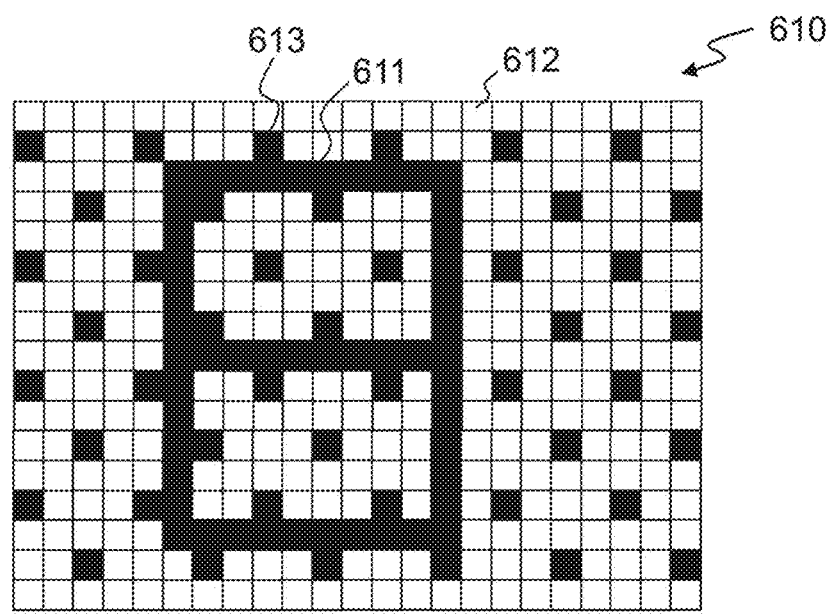
FIG. 6B is a schematic diagram illustrating an example of a region 610 of a part of a binary image.

FIG. 6B is a schematic diagram illustrating an example of a region 610 of a part of a binary image.

FIG. 6B illustrates a region 610 acquired by binarizing the region 600 shown in FIG. 6A. As shown in FIG. 6B, in the region 610, pixels 612 corresponding to the background 602 are set to white pixels, and pixels 611 corresponding to the character 601 and pixels 613 corresponding to the symbols 603 of the shading are set to black pixels.

Next, the detection module 223 detects a pixel satisfying the condition set in the shading pattern stored in the second storage device 210 from the acquired multiple value image as a part of the shading (step S204). The detection module 223 selects each pixel in the multiple value image as a target pixel in order, and determines whether or not each pixel satisfies a condition set in at least one shading pattern among the plurality of shading patterns stored in the second storage device 210. The detection module 223 regards a pixel satisfying the condition set in at least one shading pattern as a shading pixel corresponding to the symbol of the shading and detects the pixel as a part of the shading. In other words, when a pixel in the multiple value image satisfies the condition set in at least one shading pattern among the plurality of shading patterns, the detection module 223 detects the pixel as a part of the shading. On the other hand, the detection module 223 regards a pixel that does not satisfy the condition set in any of the shading patterns as a non-shading pixel that does not correspond to the symbol of the shading.

FIGS. 7A to 7C, 8A to 8C are schematic diagrams for illustrating the shading pixel.

Figure 7A:
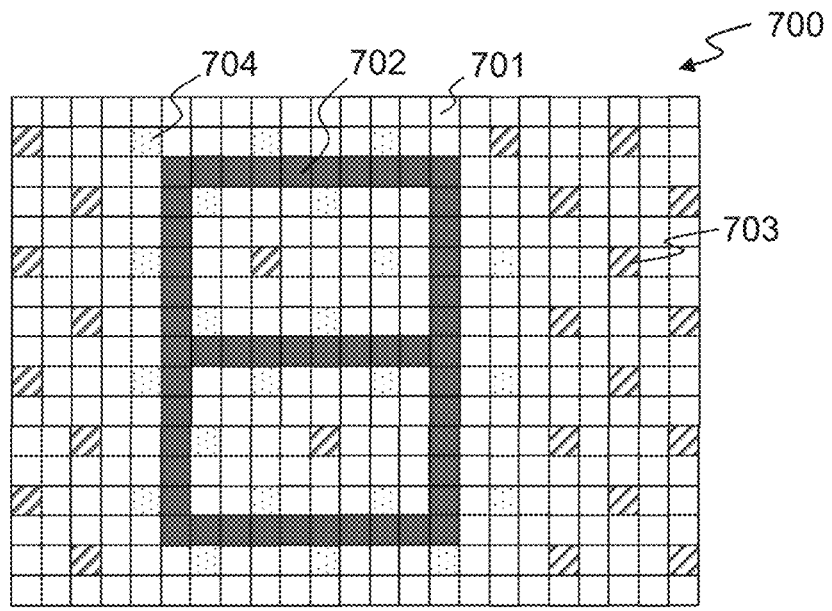
FIG. 7A is a schematic diagram for illustrating a shading pixel.

The image 700 shown in FIG. 7A is a schematic diagram for illustrating a shading pixel detected when the shading pattern 300 is applied to the region 600 of a part of the multiple value image shown in FIG. 6A. As shown in FIG. 7A, when the shading pattern 300 is applied to the region 600, pixels 703 (pixels indicated by shaded lines) corresponding to a symbol from which other symbols exist apart by substantially the same distance in the eight directions across the background, are detected as shading pixels. On the other hand, pixels 701 corresponding to the background and not corresponding to the symbol, and pixels 702 corresponding to the character and not corresponding to the symbol, are regarded as non-shading pixels. Further, pixels 704 (pixels indicated by dots) corresponding to a symbol from which other symbols do not exist apart by substantially the same distance in the eight directions across the background or in which the background does not exist between the symbol and a symbol adjacent to the symbol are also regarded as non-shading pixels even when the pixels 704 corresponds to a symbol.

Figure 7B:
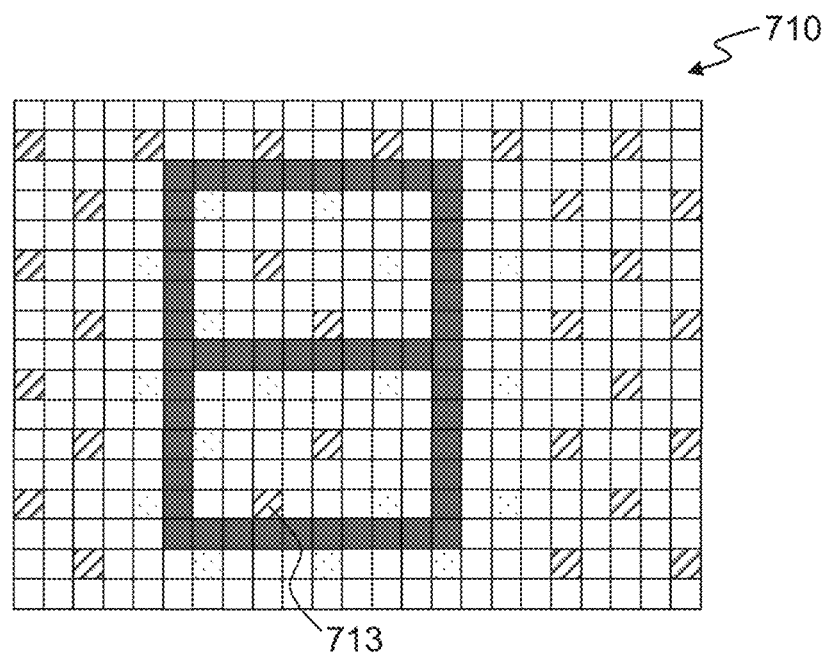
FIG. 7B is a schematic diagram for illustrating the shading pixel.

An image 710 shown in FIG. 7B is a schematic diagram for illustrating a shading pixel detected when the shading pattern 310 is applied to the region 600. As shown in FIG. 7B, when the shading pattern 310 is applied to the region 600, pixels 713 corresponding a symbol from which other symbols exist apart by substantially the same distances in the left, upper left, upper, upper right and right direction across the background, are detected as shading pixels. In other words, when the shading pattern 310 is applied, the pixels 713 corresponding to a symbol wherein a character, etc., exists between the symbol and other symbols adjacent to the symbol in the other three directions (the lower left, lower, lower right directions), are also detected as the shading pixels.

Figure 7C:
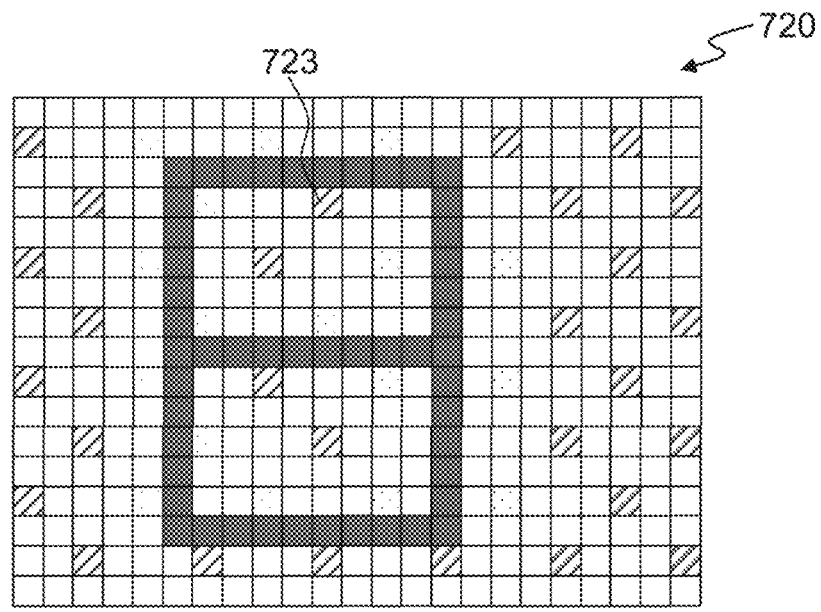
FIG. 7C is a schematic diagram for illustrating the shading pixel.

An image 720 shown in FIG. 7C is a schematic diagram for illustrating a shading pixel detected when the shading pattern 320 is applied to the region 600. As shown in FIG. 7C, when the shading pattern 320 is applied to the region 600, pixels 723 corresponding a symbol from which other symbols exist apart by substantially the same distances in the left, lower left, lower, lower right and right direction across the background, are detected as shading pixels. In other words, when the shading pattern 320 is applied, the pixels 723 corresponding to a symbol wherein a character, etc., exists between the symbol and other symbols adjacent to the symbol in the other three directions (the upper left, upper, upper right directions), are also detected as the shading pixels.

Figure 8A:
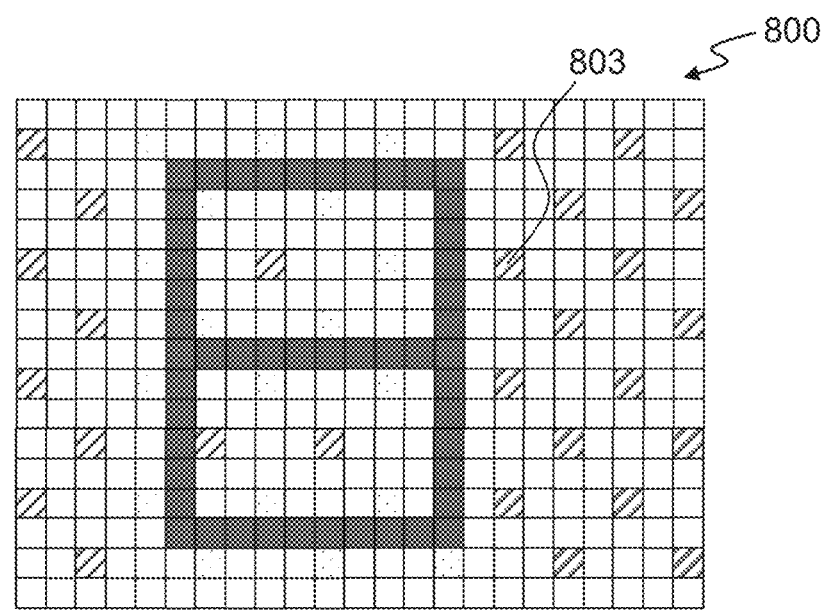
FIG. 8A is a schematic diagram for illustrating the shading pixel.

An image 800 shown in FIG. 8A is a schematic diagram for illustrating a shading pixel detected when the shading pattern 330 is applied to the region 600. As shown in FIG. 8A, when the shading pattern 330 is applied to a region 600, pixels 803 corresponding a symbol from which other symbols exist apart by substantially the same distances in the upper, upper right, right, lower right and lower direction across the background, are detected as shading pixels. In other words, when the shading pattern 330 is applied, the pixels 803 corresponding to a symbol wherein a character, etc., exists between the symbol and other symbols adjacent to the symbol in the other three directions (the upper left, left, lower left directions), are also detected as the shading pixels.

Figure 8B:
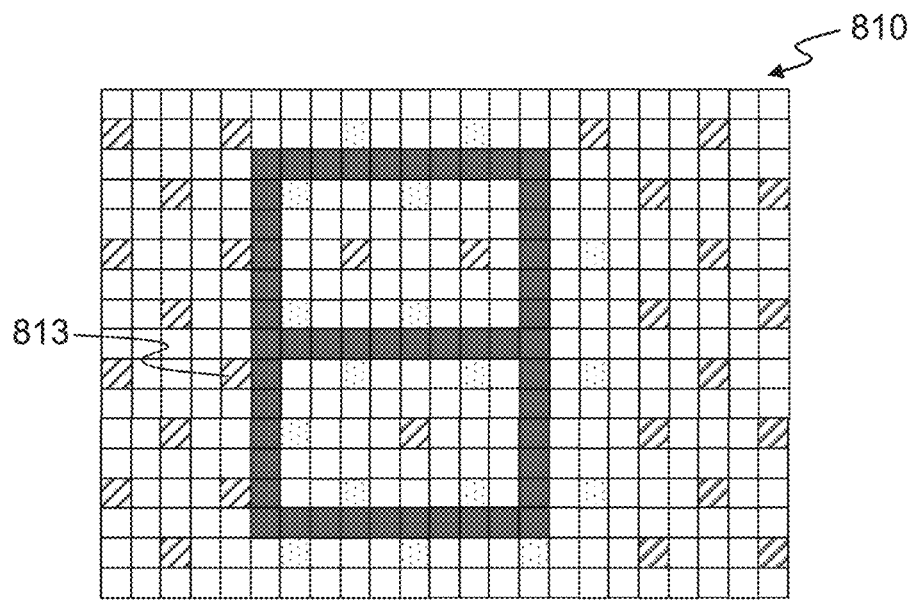
FIG. 8B is a schematic diagram for illustrating the shading pixel.

An image 810 shown in FIG. 8B is a schematic diagram for illustrating a shading pixel detected when the shading pattern 340 is applied to the region 600. As shown in FIG. 8B, when the shading pattern 340 is applied to an region 600, pixels 813 corresponding a symbol from which other symbols exist apart by substantially the same distances in the upper, upper left, left, lower left and lower direction across the background, are detected as shading pixels. In other words, when the shading pattern 340 is applied, the pixels 813 corresponding to a symbol wherein a character, etc., exists between the symbol and other symbols adjacent to the symbol in the other three directions (the upper right, right, lower right directions), are also detected as the shading pixels.

Figure 8C:
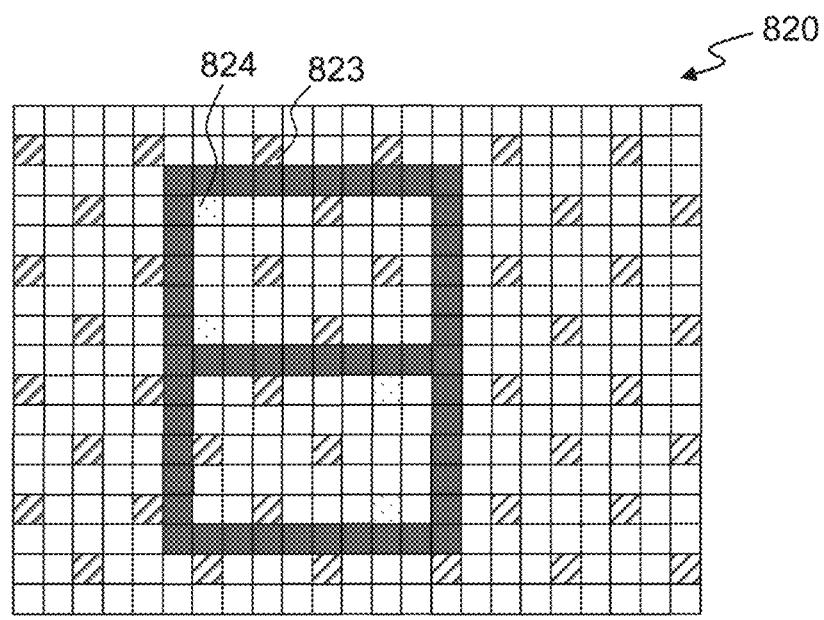
FIG. 8C is a schematic diagram for illustrating the shading pixel.

FIG. 8C is a schematic diagram for illustrating a shading pixel satisfying the condition set in any of the shading patterns. In an image 820 shown in FIG. 8C, pixels 823 indicated by shaded lines indicate pixels detected as shading pixels by any of the shading patterns, and the other pixels indicate pixels regarded as non-shading pixels for all the shading patterns. Although, pixels corresponding to symbols, such as pixels 824 indicated in dots, may also be regarded as non-shading pixels, almost all pixels corresponding to symbols have been detected as shading pixels. In particular, by using a plurality of shading patterns corresponding to various patterns, the detection module 223 can also suitably detect pixels 823 corresponding to symbols (symbols 603, etc., in FIG. 6) located in the vicinity of a character as the shading pixels.

Next, the shading removal pattern generation module 224 generates a shading removal pattern for removing the detected shading based on the multiple value image (step S205). The shading removal pattern generation module 224 generates the shading removal pattern based on the shading pattern used when detecting each of the shading pixels. The shading removal pattern generation module 224 generates a shading removal pattern, by expanding each of the shading pixels according to the shading pattern used when detecting each of the shading pixels.

The shading removal pattern generation module 224 expands each of the shading pixels by a predetermined number of pixels in a direction (a predetermined direction) to the background pixel or the symbol pixel from the target pixel defined by the condition set in each of the shading patterns. The predetermined number of pixels is, for example, a number of pixels between the target pixel defined by the condition set in each of the shading patterns and the background pixel adjacent to the target pixel. In the example shown in FIG. 3, the predetermined number of pixels is 2 in the horizontal and vertical directions, 1 in the oblique direction. The shading removal pattern generation module 224 identifies, for each of the detected shading pixels, each pixel existing within a predetermined distance in a predetermined direction, as an expanded pixel. The shading removal pattern generation module 224 identifies an area including the shading pixels and the expanded pixels, and generates a pattern of the specified area as the shading removal pattern.

FIGS. 9A to 9C, 10A to 10C are schematic diagrams for illustrating the shading removal pattern.

Figure 9A:
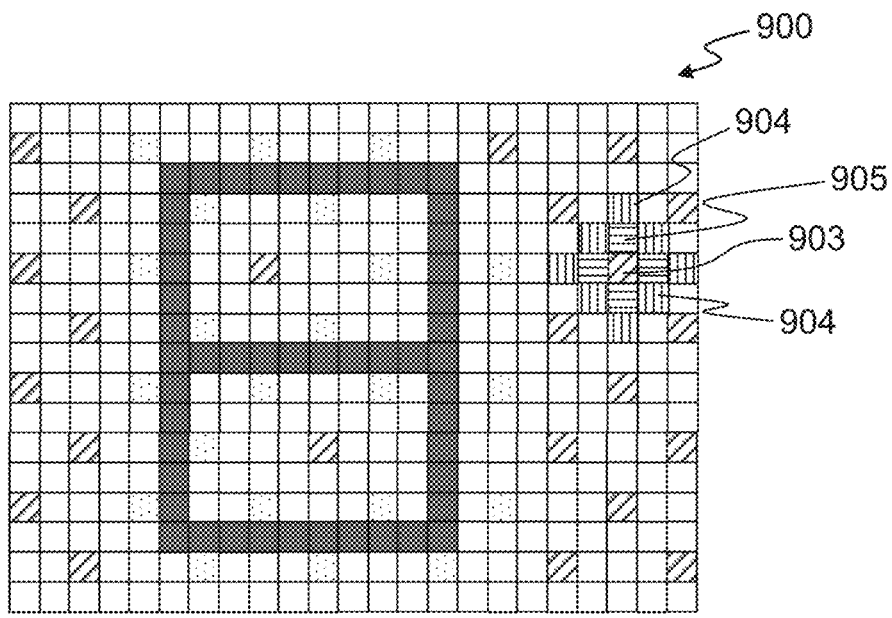
FIG. 9A is a schematic diagram for illustrating a shading removal pattern.

An image 900 shown in FIG. 9A is a schematic diagram for illustrating expanded pixels acquired by expanding pixels 903 corresponding to the shading pixels 703 shown in FIG. 7A. As shown in FIG. 9A, pixels 904 corresponding to the background pixel set in the shading pattern 300 used when detecting the shading pixels 703 and pixels 905 corresponding to pixels between the shading pixels 703 and each background pixel are specified with respect to the pixels 903, as the expanded pixels.

Figure 9B:
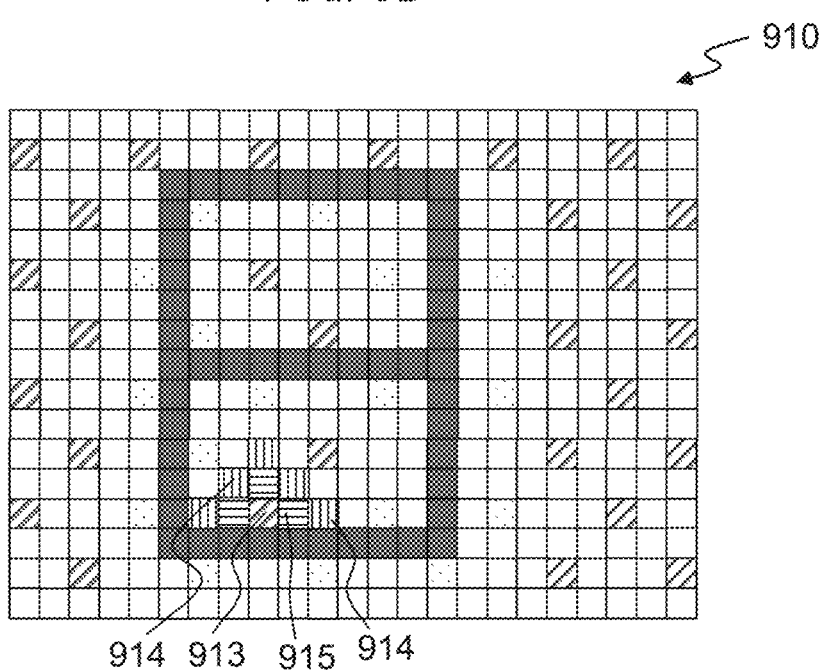
FIG. 9B is a schematic diagram for illustrating the shading removal pattern.

An image 910 shown in FIG. 9B is a schematic diagram for illustrating expanded pixels acquired by expanding pixels 913 corresponding to the shading pixels 713 shown in FIG. 7B. As shown in FIG. 9B pixels 914 corresponding to the background pixel set in the shading pattern 310 used when detecting the shading pixels 713 and pixels 915 corresponding to pixels between the shading pixels 713 and each background pixel are specified with respect to the pixels 913, as the expanded pixels.

Figure 9C:
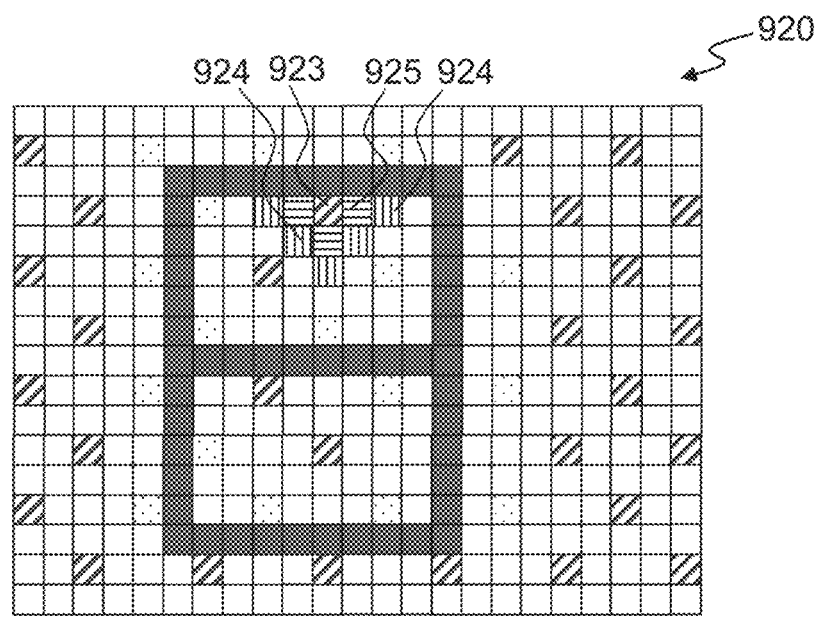
FIG. 9C is a schematic diagram for illustrating the shading removal pattern.

An image 920 shown in FIG. 9C is a schematic diagram for illustrating expanded pixels acquired by expanding pixels 923 corresponding to the shading pixels 713 shown in FIG. 7C. As shown in FIG. 9C, pixels 924 corresponding to the background pixel set in the shading pattern 320 used when detecting the shading pixels 723 and pixels 925 corresponding to pixels between the shading pixels 723 and each background pixel are specified with respect to the pixel 923, as the expanded pixels.

Figure 10A:
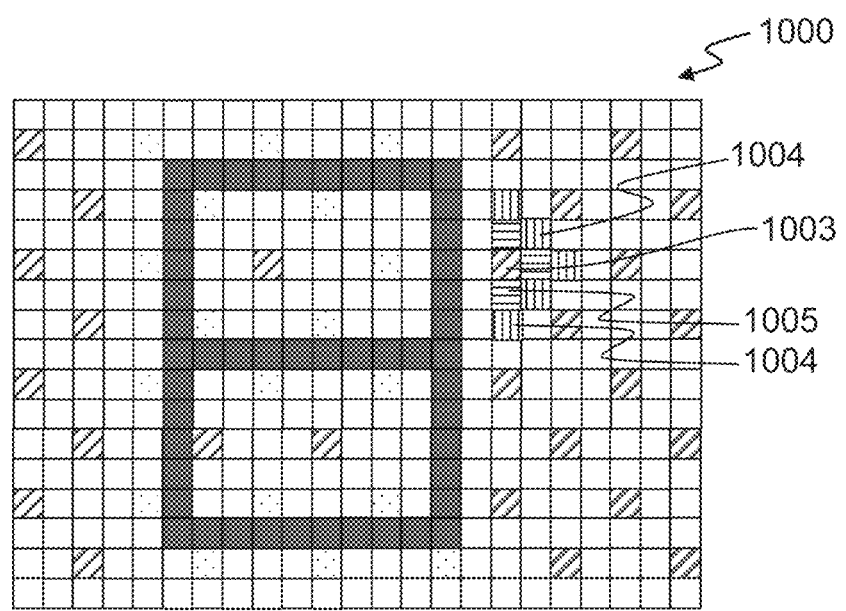
FIG. 10A is a schematic diagram for illustrating the shading removal pattern.

An image 1000 shown in FIG. 10A is a schematic diagram for illustrating expanded pixels by expanding pixels 1003 corresponding to the shading pixels 803 shown in FIG. 8A. As shown in FIG. 10A, pixels 1004 corresponding to the background pixel set in the shading pattern 330 used when detecting the shading pixels 803 and pixels 1005 corresponding to pixels between the shading pixels 803 and each background pixel are specified with respect to the pixel 1003, as the expanded pixels.

Figure 10B:
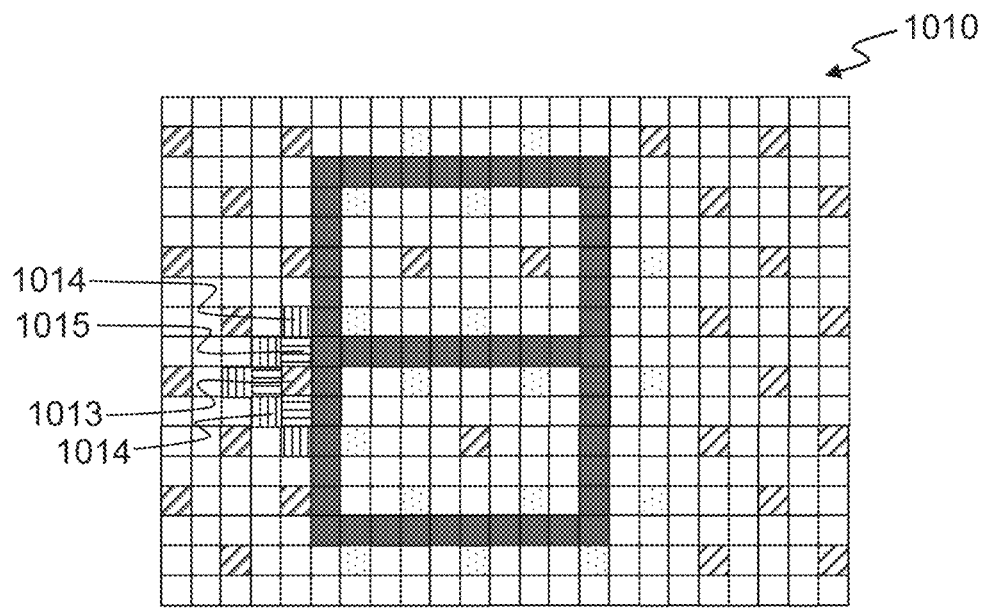
FIG. 10B is a schematic diagram for illustrating the shading removal pattern.

An image 1010 shown in FIG. 10B is a schematic diagram for illustrating expanded pixels by expanding pixels 1013 corresponding to the shading pixels 813 shown in FIG. 8B. As shown in FIG. 10B, pixels 1014 corresponding to the background pixel set in the shading pattern 340 used when detecting the shading pixels 813 and pixels 1015 corresponding to pixels between the shading pixels 813 and each background pixel are specified with respect to the pixels 1013, as expanded pixels.

Figure 10C:
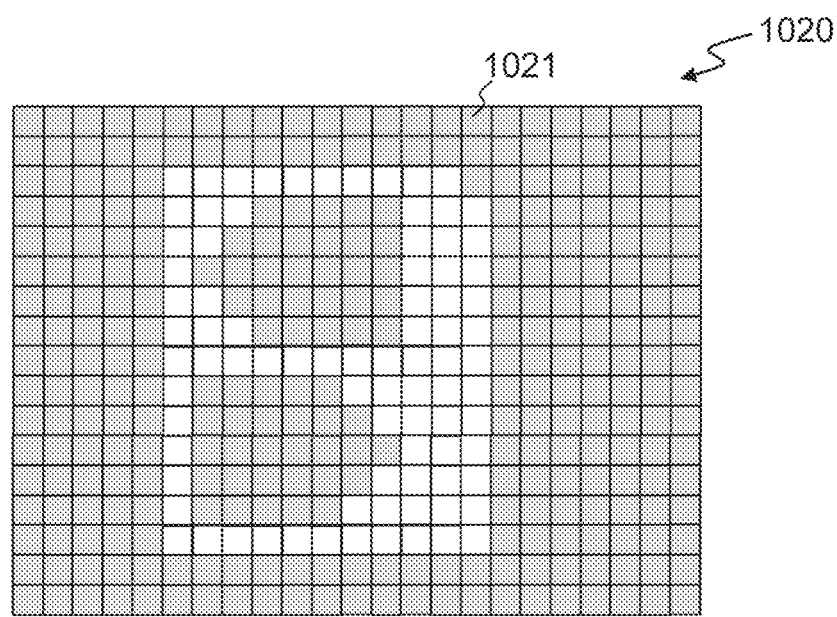
FIG. 10C is a schematic diagram for illustrating the shading removal pattern.

FIG. 10C is a schematic diagram for illustrating a shading removal pattern corresponding to a region including shading pixels and expanded pixels. In the image 1020 shown in FIG. 10C, a region 1021 shown in gray, shows a region including shading pixels detected by any shading pattern and expanded pixels expanded from any shading pixel. A pattern corresponding to the region 1021 is specified as a shading removal pattern. As shown in FIG. 10C, the region 1021 does not include pixels corresponding to a character. Also, although a part of pixels corresponding to a shading or a background are not included in the region 1021, almost all of pixels corresponding to the shading or the background are included in the region 1021. The shading removal pattern generation module 224 can generate a shading removal pattern so as to suitably include pixels corresponding to the shading, by expanding each shading pixel only in a predetermined direction defined in the condition set in each shading pattern.

Next, the shading removal image generation module 225 generate a shading removal image in which a shading is removed from the binary image, by applying the shading removal pattern to the binary image (step S206).

The shading removal image generation module 225 specifies the shading area corresponding to the shading removal pattern in the binary image. The shading removal image generation module 225 selects each pixel in the specified shading area in order as a target pixel, and determines whether or not the white pixel is included in a predetermined range from the target pixel. When the white pixel is included in the predetermined range from the target pixel, the shading removal image generation module 225 corrects the shading area by replacing the target pixel with the white pixel. Thus, the shading removal image generation module 225 generates the shading removal image acquired by correcting the shading area in the binary image The predetermined range is set based on the shading pattern. The predetermined range is, for example, within a distance between the target pixel defined in the condition set by the shading pattern and the background pixel adjacent to the target pixel. In the example shown in FIG. 3, the predetermined range is a range of two pixels in the horizontal and vertical directions, the range of one pixel in the oblique direction. By the predetermined range set to the distance between the target pixel and the background pixel, a pixel corresponding to the background exists reliably within the predetermined range, and the shading removal image generation module 225 can suitably replace each pixel in the shading area with a pixel corresponding to the background.

Figure 11:
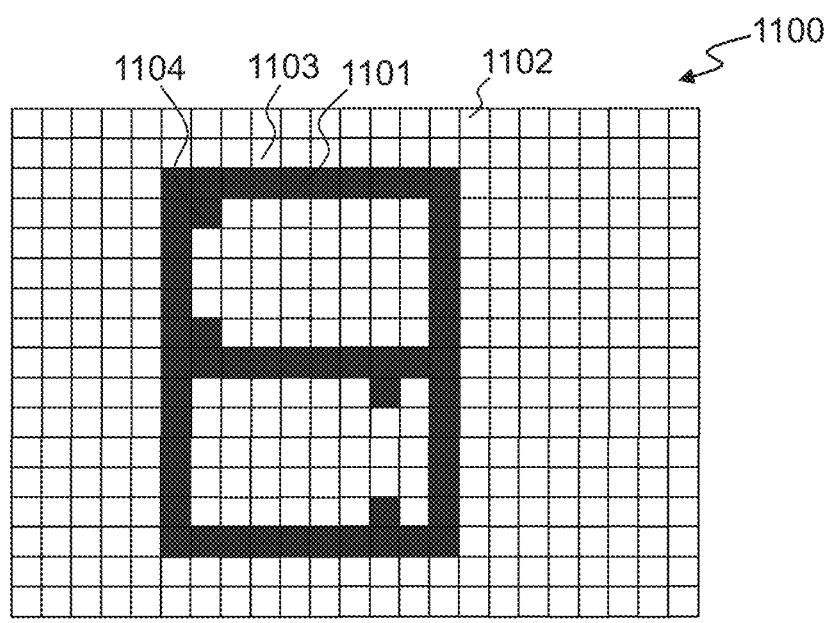
FIG. 11 is a schematic diagram illustrating an example of a region 1100 of a part of a shading removal image.

FIG. 11 is a schematic diagram illustrating an example of a region 1100 of a part of the shading removal image.

The region 1100 shown in FIG. 11 is generated from the region 610 of the binary image shown in FIG. 6B. As shown in FIG. 11, in the shading removal image, while a component 1101 of the character remains, a component 1103 corresponding to the symbols is assimilated to a component 1102 corresponding to the background, a component of the shading is removed suitably. In particular, in the shading removal image, the component 1103 corresponding to the symbols 603 adjacent to the character in the binary image shown in FIG. 6B is also been removed suitably. Incidentally, in the region 1100, a component 1104 corresponding to a part of the symbols remain without being removed. However, the component in which the shading is not removed is sufficiently small, and the shading is removed so that the user can identify the character well and the information processing apparatus 200 can recognize the character well in a character recognition process to be described later.

The shading removal image generation module 225 may generate a shading removal image by removing an isolated point only within the shading area. In this case, the shading removal image generation module 225 groups the black pixels in the shading area by labeling, and corrects the shading area by replacing the group whose size (area) is equal to or less than a predetermined size, among the groups of the black pixels, with white pixels.

Next, the character recognition module 226 detects characters from the generated shading removal image using a known OCR (Optical Character Recognition) technique (step S207).

Next, the output control module 227 displays the detected characters on the display device 203 (step S208) and ends the series of steps. The output control module 227 may display the shading removal image on the display device 203, in place of or in addition to the detected characters. Further, the output control module 227 may transmit the detected characters or the shading removal image to a server, etc., (not shown) via a communication device (not shown). Thus, the output control module 227 outputs the shading removal image or information generated using the shading removal image.

A plurality of the conditions may be set in the shading pattern. In this case, when pixels in the multiple value image satisfy a part of the conditions even when the pixels do not satisfy all the conditions set in the shading pattern, the detection module 223 may detect the pixels as a part of the shading. In that case, in step S204, the detection module 223 detects pixels satisfying a predetermined number of conditions of a plurality of conditions set in any shading pattern (e.g., 80% of the conditions of all conditions), as a shading pixel. Thus, the shading can be more easily detect.

Further, the information processing apparatus 200 may, using only the shading pattern in which a plurality of conditions are set in advance, such as the shading pattern 300 shown in FIG. 3A, detect pixels satisfying conditions according to a combination set in advance, among conditions set in the shading pattern, as the shading pixel. In that case, the information processing apparatus 200 can flexibly change the conditions for detecting the shading by changing the combination of the conditions.

Further, in step S204, the detection module 223 may detect the shading pixels from the multiple value image using the shading pattern, after expanding or reducing the multiple value image according to a resolution at which the image reading apparatus 100 reads the input image. In this case, the detection module 223 acquires the resolution from the image reading apparatus 100 via the second interface device 201, and expands or reduces the multiple value image in accordance with the acquired resolution so that the shading in the multiple value image matches the size of the shading assumed in the shading pattern.

As described in detail above, by operating in accordance with the flowchart illustrated in FIG. 5, the information processing apparatus 200 detects the shading based on the gradation value of each pixel having a predetermined positional relationship in the multiple value image. Thus, the information processing apparatus 200 can detect the shading with higher accuracy than when detecting the shading based on only the positional relationship of valid pixels in the binary image, thereby the information processing apparatus 200 can more accurately remove the shading from the image including the shading.

Generally, the shading has an intermediate color between background color and character color, and the pixels corresponding to the symbols or the lines of the shading in the multiple value image have the intermediate color between white and black. Therefore, the pixels corresponding to the symbols or the lines of the shading in the binary image acquired by binarizing the multiple value image may be set to white pixels or black pixels depending on a magnitude of a threshold for binarizing. In the binary image, a noise in the multiple value image may be set to a black pixel, and be assimilated to the symbol of the shading. Therefore, when the shading is detect from the binary image, the shading may not be detected, or the noise may be erroneously detected as the shading. The information processing apparatus 200 detects the shading based on the gradation value of each pixel having a predetermined positional relationship in the multiple value image, thereby the information processing apparatus 200 can detect the shading with higher accuracy than when detecting the shading based only on the positional relationship of the valid pixels in the binary image. By detecting the shading with high accuracy, the information processing apparatus 200 can accurately remove only the shading while leaving the character from the image including the shading.

In particular, since the gradation value of each pixel in the binary image is any of the binary values, the relationship between the gradation values of each pixel is only one of the same or different. The information processing apparatus 200 detects the shading based on the relationship between the difference or the ratio, etc., between the gradation values of the plurality of pixels in the multiple value image, thereby the information processing apparatus 200 can detect the shading with higher accuracy than when detecting the shading based only on the positional relationship of the valid pixels in the binary image.

Figure 12:
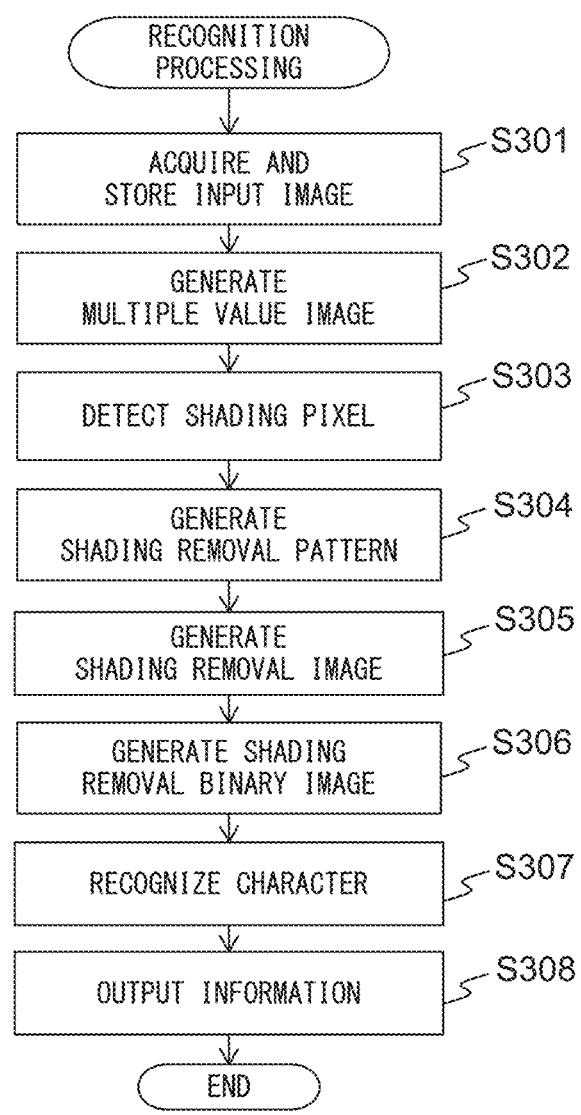
FIG. 12 is a flowchart illustrating another example of the operation of the recognition process.

FIG. 12 is a flowchart illustrating another operation example of the recognition processing. This flowchart is executed in the information processing apparatus 200 in place of the flowchart shown in FIG. 5. In the flowchart shown in FIG. 12, unlike the flowchart shown in FIG. 5, the shading removal image generation module 225 generates the shading removal image from the multiple value image rather than the binary image. In the flowchart shown in FIG. 12, the process of step S203 of FIG. 5 is omitted. Since the processes of step S301 to S302, S303 to S304 of FIG. 12 is the same as the processes of step S201 to S202, S204 to S205 of FIG. 5, a description thereof will be omitted.

In step S305, the shading removal image generation module 225 generate the shading removal image acquired by removing the shading from the multiple value image by applying the shading removal pattern to the multiple value image (step S305)

The shading removal image generation module 225 specifies the shading area corresponding to the shading removal pattern in the multiple value image. The shading removal image generation module 225 corrects the shading area, by applying a smoothing filter to the specified shading area. Thus, the shading removal image generation module 225 generates the shading removal image acquired by correcting the shading area in the multiple value image.

The smoothing filter is a known filter such as an averaging filter or a Gaussian filter. The size of the smoothing filter is set based on the shading pattern. The horizontal and vertical size of the smoothing filter is set to, for example, a distance between two background pixels adjacent to the target pixel in the horizontal and vertical directions, which is defined in the condition set in the shading pattern. In the example shown in FIG. 3, the horizontal and vertical size of the smoothing filter is set to 5 pixels. Thus, the range of application of the filter includes the background pixels surrounding the target pixel and does not include symbol pixels adjacent to the target pixel in the horizontal and vertical directions. Therefore, the shading removal image generation module 225 can average each pixel in the shaded area so that a gradation value of each pixel gets close a gradation value of the background pixel.

The shading removal image generation module 225 may correct the shading area by replacing a pixel value of the target pixel in the specified shading area with a pixel value of a pixel having the highest luminance among pixels in the second predetermined range from the target pixel.

The second predetermined range is set based on the shading pattern. The second predetermined range is, for example, within a distance between the target pixel defined in the condition set in the shading pattern and the background pixel adjacent to the target pixel. In the example shown in FIG. 3, the second predetermined range is a range of two pixels in the horizontal and vertical directions, and a range of one pixel in the oblique direction. By the second predetermined range set to the distance between the target pixel and the background pixel, a pixel corresponding to the background surely exists within the second predetermined range, thereby the shading removal image generation module 225 can suitably replace each pixel in the shaded area with a pixel corresponding to the background.

Figure 13:
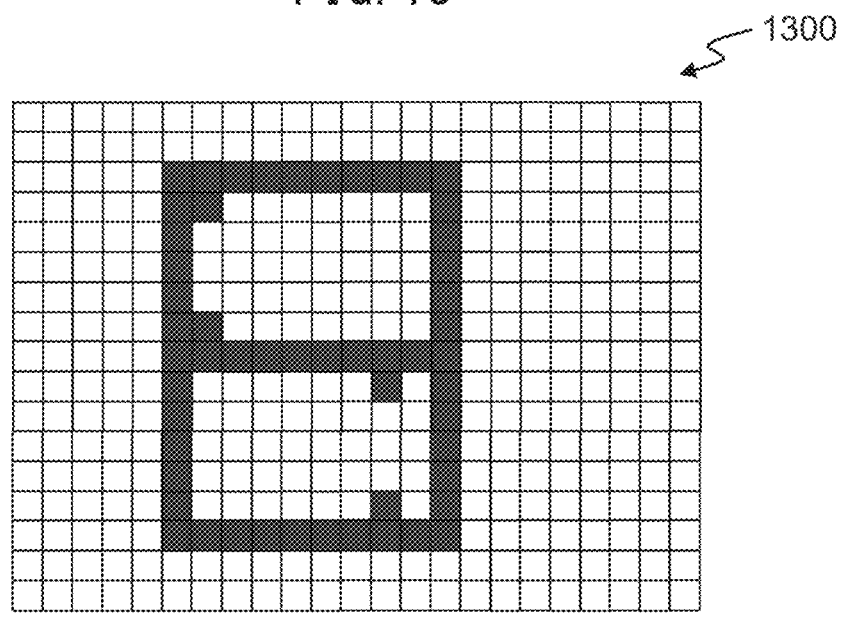
FIG. 13 is a schematic diagram illustrating an example of a region 1300 of a part of a shading removal image.

FIG. 13 is a schematic diagram illustrating an example of a region 1300 of a part of the shading removal image generated from the multiple value image.

The region 1300 shown in FIG. 13 is generated from the region 600 in the multiple value images shown in FIG. 6A. As shown in FIG. 13, even in the shading removal image generated from the multiple value image, similarly to the shading removal image generated from the binary image shown in FIG. 11, the component of the shading is removed suitably.

Next, the shading removal image generation module 225 generates a shading removal binary image acquired by binarizing the shading removal image (step S306). The shading removal image generation module 225 generates an image in which a pixel whose gradation value is equal to or more than a threshold value in the shading removal image is set as the white pixel and a pixel whose gradation value is less than the threshold value is set as the black pixel, as a shading removal binary image. The threshold value is set to be larger than a gradation value of a pixel forming a general character by prior experiments. Thus, in the shading removal binary image, pixels corresponding to characters in the shading removal image are set as the black pixel, and pixels corresponding to other pixels are set as the white pixel. The shading removal binary image is an image similar to the shading removal image generated from the binary image shown in FIG. 11.

The shading removal image generation module 225 may generate the shading removal binary image from the multiple value image without generating the shading removal image. In this case, the shading removal image generation module 225 sets the threshold value for binarizing so that a threshold value for binarizing for each pixel in the shaded area is smaller than a threshold value for binarizing for each pixel outside the shading area. Thus, the shading removal image generation module 225 binarizes each pixel outside the shading area as usual, and binarizes each pixel in the shading area so as to be easily determined as the white pixels, so that the shading can be suitably removed.

Next, the character recognition module 226 detects characters from the generated shading removal binary image using the well-known OCR technique (step S307).

Next, the output control module 227 displays the detected characters on the display device 203 (step S308) and ends the series of steps. The output control module 227 may display the shading removal image or the shading removal binary image on the display device 203, in place of or in addition to the detected characters. Further, the output control module 227 may transmit the detected characters, the shading removal image or the shading removal binary image to a server (not shown), etc., via a communication device (not shown).

As described in detail above, the information processing apparatus 200 can more accurately remove the shading from the image including the shading, by operating in accordance with the flowchart shown in FIG. 12

Figure 14:
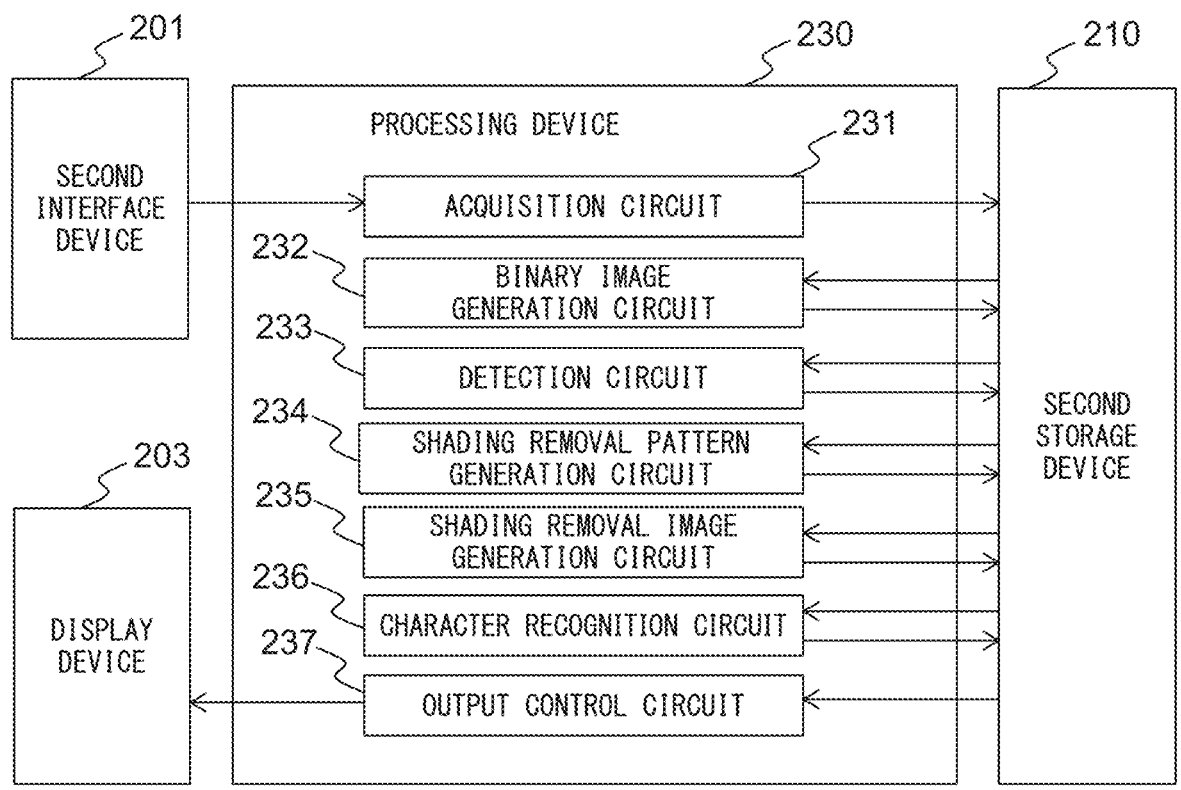
FIG. 14 is a block diagram illustrating a schematic configuration of a processing device 230.

FIG. 14 is a block diagram illustrating a schematic configuration of a processing device 230 in an information processing apparatus according to another embodiment.

The processor 230 performs the recognition processing in place of the second CPU 220. The processing device 230 includes an acquisition circuit 231, a binary image generation circuit 232, a detection circuit 233, a shading removal pattern generation circuit 234, a shading removal image generation circuit 235, a character recognition circuit 236, an output control circuit 237, etc.

The acquisition circuit 231 is an example of the acquisition module and has a function similar to the acquisition module 221. The acquisition circuit 231 acquires the input image from the image reading apparatus 100 via the second interface device 201, generates the multiple value image from the input image, and stores the multiple value image in the second storage device 210.

The binary image generation circuit 232 is an example of the binary image generation module, and has a function similar to the binary image generation module 222. The binary image generation circuit 232 reads out the multiple value image from the second storage device 210, generates the binary image from the multiple value image, and stores the multiple value image in the second storage device 210.

The detection circuit 233 is an example of a detection module, and has a functions similar to the detection module 223. The detection circuit 233 reads out the multiple value image and the shading pattern from the second storage device 210, detects the shading pixel satisfying the condition set in the shading pattern from the multiple value image, and stores the detection result in the second storage device 210.

The shading removal pattern generation circuit 234 is an example of a shading removal pattern generation module has a function similar to the shading removal pattern generation module 224. Shading removal pattern generation circuit 234 reads out the detection result of the multiple value image and the shading pixel from the second storage device 210, generates the shading removal pattern based on the information, and stores the second storage device 210.

The shading removal image generation circuit 235 is an example of the shading removal image generation module and has a function similar to the shading removal image generation module 225. The shading removal image generation circuit 235 reads out the binary image or the multiple value image and the shading removal pattern from the second storage device 210, generates the shading removal image based on the information, and stores it in the second storage device 210.

The character recognition circuit 236 is an example of a character recognition module, and has a function similar to the character recognition module 226. The character recognition circuit 236 reads out the shading removal image or the shading removal binary image from the second storage device 210, detects the character from the read image, and stores the detection result in the second storage device 210.

The output control circuit 237 is an example of an output control module, and has a function similar to the output control module 227. The output control circuit 237 reads out the detection result of the character, the shading removal image or the shading removal binary image from the second storage device 210, and outputs the read information to the display device 203.

As described in detail above, the information processing apparatus can more accurately remove the shading from the image including the shading even when using the processing apparatus 230.

While preferred embodiments have been described above, embodiments are not limited to the above. For example, sharing of functions between the image reading apparatus 100 and the information processing apparatus 200 is not limited to the examples of the image processing systems 1 illustrated in FIG. 1, the components of the image reading apparatus 100 and the information processing apparatus 200 can be provided any of the image reading apparatus 100 and the information processing device 200 as appropriate. Alternatively, the image reading apparatus 100 and the information processing apparatus 200 may be configured as a single apparatus.

For example, the first storage device 110 of the image reading apparatus 100 stores the programs stored in the second storage device 210 of the information processing apparatus 200, and the first CPU 120 of the image reading apparatus 100 may operate as the respective modules realized by the second (PU 120 of the information processing apparatus 200. Further, the image reading apparatus 100 may have the same processing device as the processing device 230 of the information processing apparatus 200

In that case, the image reading apparatus 100 has the same display device as the display device 203. Since the recognition processing is performed by the image reading device 100, the transmission/reception processes of the input images in steps S102, S201, S301 are omitted. The processes in steps S202 to S208, S302 to S308 is performed by the first CPU 120 or the processing circuit of the image reading apparatus 100. The operation of the processing is similar to that performed by the second CPU 220 or the processing apparatus 230 of the information processing apparatus 200.

Furthermore, the first interface device 101 and the second interface device 201 in the image processing system 1 may be interconnected through a network such as the Internet, a telephone network (including a mobile network and a fixed-telephone network) or an intranet. In that case, each of the first interface device 101 and the second interface device 201 is equipped with an interface circuit for connecting to the network. Additionally, in that case, a plurality of information processing apparatuses may be distributed on the network and the information processing apparatuses may cooperate with one another to perform the recognition processing, etc., in a distributed manner, so that image processing services can be provided in the form of cloud computing. Thus, the image processing system 1 can efficiently perform the recognition processing on the input images read by the plurality of image reading apparatuses.

Figure 15A:
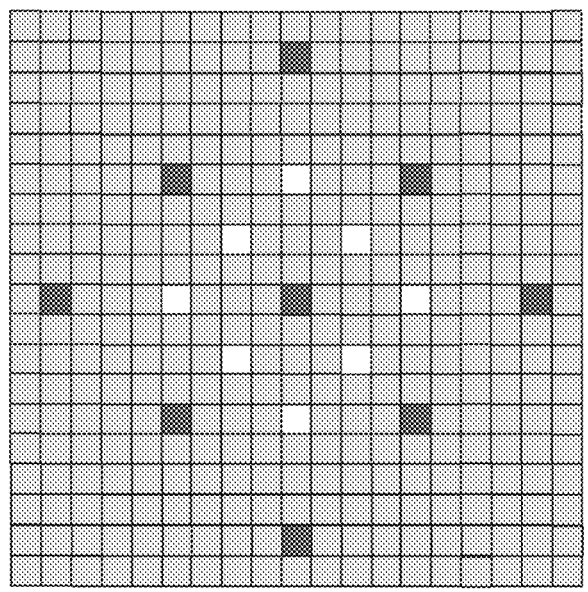
FIG. 15A is a schematic diagram illustrating another example of the shading pattern.
Figure 15B:
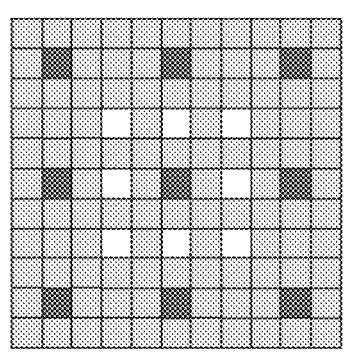
FIG. 15B is a schematic diagram illustrating another example of the shading pattern.

FIGS. 15A, 15B are schematic diagrams illustrating another example of the shading pattern. In the shading pattern 1500 shown in FIG. 15A, an interval of pixels corresponding to each condition is larger than an interval of pixels corresponding to each condition in the shading pattern 300 shown in FIG. 3A. In the shading pattern 1500, the following eight Conditions are set.

$V(x,y+4)-V(x,y)>T$ and $V(x,y+4)-V(x,y+8)>T$ — Condition 1:

$V(x,y-4)-V(x,y)>T$ and $V(x,y-4)-V(x,y-8)>T$ — Condition 2:

$V(x+4,y)-V(x,y)>T$ and $V(x+4,y)-V(x+8,y)>T$ — Condition 3:

$V(x-4,y)-V(x,y)>T$ and $V(x-4,y)-V(x-8,y)>T$ — Condition 4:

$V(x+2,y+2)-V(x,y)>T$ and $V(x+2,y+2)-V(x+4,y+4)>T$ — Condition 5:

$V(x-2,y-2)-V(x,y)>T$ and $V(x-2,y-2)-V(x-4,y-4)>T$ — Condition 6:

$V(x-2,y+2)-V(x,y)>1T$ and $V(x-2,y+2)-V(x-4,y+4)>T$ — Condition 7:

$V(x+2,y-2)-V(x,y)>T$ and $V(x+2,y-2)-V(x+4,y-4)>T$ — Condition 8:

In the shading pattern 1510 shown in FIG. 15B, an interval of pixels corresponding to the condition of the oblique direction is larger than an interval of pixels corresponding to the condition of the oblique direction in the shading pattern 300 shown in FIG. 3A In the shading pattern 1510, the following eight Conditions are set.

$V(x,y+2)-V(x,y)>T$ and $V(x,y+2)-V(x,y+4)>T$ — Condition 1:

$V(x,y-2)-V(x,y)>T$ and $V(x,y-2)-V(x,y-4)>T$ — Condition 2:

$V(x+2,y)-V(x,y)>T$ and $V(x+2,y)-V(x+4,y)>T$ — Condition 3:

$V(x-2,y)-V(x,y)>T$ and $V(x-2,y)-V(x-4,y)>T$ — Condition 4:

$V(x+2,y+2)-V(x,y)>T$ and $V(x+2,y+2)-V(x+4,y+4)>T$ — Condition 5:

$V(x-2,y-2)-V(x,y)>T$ and $V(x-4,y-4)-V(x-4,y-4)>T$ — Condition 6:

$V(x-2,y+2)-V(x,y)>T$ and $V(x-2,y+2)-V(x-4,y-4)>T$ — Condition 7:

$V(x+2,y-2)-V(x,y)>T$ and $V(x+2,y-2)-V(x+4,y-4)>T$ — Condition 8:

Thus, the shading pattern is arbitrarily set according to a type of the assumed shading

REFERENCE SIGNS LIST

1 Image processing system 1
200 Information processing apparatus
210 Second storage device
221 Acquisition module
222 Binary image generation module
223 Detection module
224 Shading removal pattern generation module
225 Shading removal image generation module
227 output control module

The invention claimed is:

1. An image processing apparatus, comprising:
a storage device to store, in advance, a shading pattern in which a condition of differences, ratios or magnitude relationships between a gradation value of a target pixel and gradation values of a plurality of pixels having a predetermined positional relationship with respect to the target pixel are set;
a processor to:
acquire a multiple value image,
generate a binary image from the multiple value image,
detect a pixel satisfying the condition set in the shading pattern from the multiple value image as a part of a shading,
generate a shading removal pattern for removing the detected shading, based on the multiple value image, and
generate a shading removal image by applying the shading removal pattern to the binary image; and
an output device to output the shading removal image or information generated using the shading removal image.

2. The image processing apparatus according to claim 1, wherein when a white pixel is included in a range based on the shading pattern from a target pixel in a shading area corresponding to the shading removal pattern in the binary image, the processor corrects the shading area by replacing the target pixel with a white pixel.

3. The image processing apparatus according to claim 1, wherein
the storage device stores a plurality of the shading patterns, and wherein
when a pixel in the multiple value image satisfies a condition set in at least one shading pattern among the plurality of shading patterns, the processor detects said pixel as a part of the shading.

4. The image processing apparatus according to claim 1, wherein
a plurality of the conditions are set in the shading pattern, and wherein
when a pixel in the multiple value image satisfies a part of the conditions even when said pixel does not satisfy all the conditions set in the shading pattern, the processor detects said pixel as a part of the shading.

5. An image processing apparatus, comprising:
a storage device to store, in advance, a shading pattern in which a condition of differences, ratios or magnitude relationships between a gradation value of a target pixel and gradation values of a plurality of pixels having a predetermined positional relationship with respect to the target pixel are set;

a processor to:
acquire a multiple value image,
detect a pixel satisfying the condition set in the shading pattern from the multiple value image as a part of a shading,
generate a shading removal pattern for removing the detected shading, based on the multiple value image, and
generate a shading removal image by applying the shading removal pattern to the multiple value image; and
an output device to output the shading removal image or information generated using the shading removal image.

6. The image processing apparatus according to claim 5, wherein the processor corrects a shading area corresponding to the shading removal pattern in the multiple value image, by applying a smoothing filter of a size based on the shading pattern to the shading area.

7. The image processing apparatus according to claim 5, wherein the processor corrects a shading area corresponding to the shading removal pattern in the multiple value image, by replacing a pixel value of a target pixel in the shading area with a pixel value of a pixel having the highest luminance among pixels in a range based on the shading pattern from the target pixel.

8. A method for generating an image, the method comprising:
Storing, in advance, a shading pattern in which a condition of differences, ratios or magnitude relationships between a gradation value of a target pixel and gradation values of a plurality of pixels having a predetermined positional relationship with respect to the target pixel are set, in a storage device;
acquiring a multiple value image;
generating a binary image from the multiple value image;
detecting a pixel satisfying the condition set in the shading pattern from the multiple value image as a part of a shading;
generating a shading removal pattern for removing the detected shading, based on the multiple value image;
generating a shading removal image by applying the shading removal pattern to the binary image; and
outputting the shading removal image or information generated using the shading removal image.

9. The method according to claim 8, further comprising correcting, when a white pixel is included in a range based on the shading pattern from a target pixel in a shading area corresponding to the shading removal pattern in the binary image, the shading area by replacing the target pixel with a white pixel.

10. The method according to claim 8, further comprising storing a plurality of the shading patterns in the storage device, and wherein
when a pixel in the multiple value image satisfies a condition set in at least one shading pattern among the plurality of shading patterns, said pixel is detected as a part of the shading.

11. The method according to claim 8, wherein
a plurality of the conditions are set in the shading pattern, and wherein
when a pixel in the multiple value image satisfies a part of the conditions even when said pixel does not satisfy all the conditions set in the shading pattern, said pixel is detected as a part of the shading.

12. A method for generating an image, the method comprising:
Storing, in advance, a shading pattern in which a condition of differences, ratios or magnitude relationships between a of a target pixel and gradation values of a plurality of pixels having a predetermined positional relationship with respect to the target pixel are set, in a storage device;
acquiring a multiple value image;
detecting a pixel satisfying the condition set in the shading pattern from the multiple value image as a part of a shading;
generating a shading removal pattern for removing the detected shading, based on the multiple value image;
generating a shading removal image by applying the shading removal pattern to the multiple value image; and
outputting the shading removal image or information generated using the shading removal image.

13. The method according to claim 12, further comprising correcting a shading area corresponding to the shading removal pattern in the multiple value image, by applying a smoothing filter of a size based on the shading pattern to the shading area.

14. The method according to claim 12, further comprising correcting a shading area corresponding to the shading removal pattern in the multiple value image, by replacing a pixel value of a target pixel in the shading area with a pixel value of a pixel having the highest luminance among pixels in a range based on the shading pattern from the target pixel.

* * * * *